(12) United States Patent
Kuramashi et al.

(10) Patent No.: US 10,626,781 B2
(45) Date of Patent: Apr. 21, 2020

(54) EXHAUST DEVICE OF ENGINE

(71) Applicant: MAZDA MOTOR CORPORATION, Hiroshima (JP)

(72) Inventors: Taku Kuramashi, Hatsukaichi (JP); Keishi Kitabatake, Hiroshima (JP); Tamotsu Takamure, Hiroshima (JP); Toshiaki Kamo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 214 days.

(21) Appl. No.: 15/858,795

(22) Filed: Dec. 29, 2017

(65) Prior Publication Data

US 2018/0258827 A1 Sep. 13, 2018

(30) Foreign Application Priority Data

Mar. 10, 2017 (JP) ................. 2017-045689

(51) Int. Cl.
| | |
|---|---|
| *F01N 13/14* | (2010.01) |
| *F01N 3/10* | (2006.01) |
| *F01N 13/10* | (2010.01) |
| *F01N 13/00* | (2010.01) |

(52) U.S. Cl.
CPC .......... *F01N 13/14* (2013.01); *F01N 3/101* (2013.01); *F01N 13/008* (2013.01); *F01N 13/102* (2013.01); *F01N 13/143* (2013.01); *F01N 2260/20* (2013.01); *F01N 2340/06* (2013.01); *Y02T 10/22* (2013.01)

(58) Field of Classification Search
CPC ...... F01N 13/008; F01N 13/102; F01N 13/14; F01N 13/143; F01N 3/101; F01N 2260/20; F01N 2340/06; Y02T 10/22
USPC .................................................. 60/320, 323
See application file for complete search history.

(56) References Cited

U.S. PATENT DOCUMENTS

| | | | |
|---|---|---|---|
| 2014/0140897 A1* | 5/2014 | Latham ................. | B01D 53/94 422/168 |
| 2015/0196877 A1* | 7/2015 | Golin ................. | B01D 53/9495 423/212 |

FOREIGN PATENT DOCUMENTS

| | | | |
|---|---|---|---|
| CN | 201786430 | * | 4/2011 |
| JP | 2015-151907 A | | 8/2015 |

OTHER PUBLICATIONS

Machine Translation CN 201786430 Done Aug. 15, 2019 (Year: 2019).*

* cited by examiner

*Primary Examiner* — Thai Ba Trieu
*Assistant Examiner* — Dapinder Singh
(74) *Attorney, Agent, or Firm* — Studebaker & Brackett PC

(57) ABSTRACT

A downstream-side heat insulating material which is provided at a side face of a GPF which is positioned on a downstream side, in an exhaust-gas flowing direction, of plural in-line arranged catalysts has a first opening portion and a second opening portion which are provided for attaching supporting members.

8 Claims, 20 Drawing Sheets

EXHAUST DEVICE OF ENGINE

BACKGROUND OF THE INVENTION

The present invention relates to an exhaust device of an engine.

Conventionally, an exhaust-gas purifying device which comprises plural in-line arranged catalysts for purifying exhaust gas is provided at an upstream side of an exhaust path of an automotive-vehicle engine, such as a diesel engine or a gasoline engine.

It is also known that the exhaust-gas purifying device and an exhaust manifold are entirely covered with a heat insulating material so that the temperature of the exhaust gas flowing in the exhaust-gas purifying device does not decrease improperly for catalyst activation.

Herein, it is necessary that the heavy catalyst device is properly supported by a supporting member. It is also necessary that an opening portion for attaching the supporting member is provided at the heat insulating material (see Japanese Patent Laid-Open Publication No. 2015-151907, for example).

However, providing large and/or many opening portions at the heat insulating material may cause a problem of heat releasing from the exhaust-gas purifying device.

SUMMARY OF THE INVENTION

Accordingly, an object of the present invention is to provide an exhaust device of an engine which can properly suppress the heat releasing from the catalyst device and also have the superior support rigidity.

The present invention is an exhaust device of an engine, comprising an exhaust manifold provided on an exhaust path for guiding exhaust gas from the engine, a first catalyst provided at an upstream side, in an exhaust-gas flowing direction, of the exhaust manifold for purifying the exhaust gas guided by the exhaust manifold, a second catalyst provided at a downstream side, in the exhaust-gas flowing direction, of the exhaust manifold for purifying the exhaust gas flowing down through the first catalyst, and a heat insulating material covering the exhaust manifold, the first catalyst, and the second catalyst, wherein the heat insulating material has plural opening portions for attaching plural supporting members, and the plural opening portions are formed at a specified part of the heat insulating material which covers the second catalyst.

According to the present invention, the support rigidity can be improved by supporting the exhaust device by the plural supporting members through the plural opening portions, and also the heat releasing can be suppressed properly by attaching the supporting members to the second catalyst provided at the downstream side, compared to a case where the supporting members are attached to the first catalyst provided at the upstream side.

In an embodiment of the present invention, the engine is an in-line multi-cylinder engine comprising an engine body provided with plural cylinders, the second catalyst is provided such that a center axis thereof is substantially vertical to a direction of a cylinder row of the engine body and a center thereof is offset, to one side, from a center, in the cylinder row direction, of the cylinder row, the plural opening portions of the insulating material include a first opening portion and a second opening portion which are respectively provided on both sides, in the cylinder row direction, of the second catalyst, and the second catalyst is supported by a first supporting member and a second supporting member which are respectively provided through the first opening portion and the second opening portion from the both sides, in the cylinder row direction, of the second catalyst.

According to this embodiment, a weight imbalance, in the cylinder row direction, of the exhaust device which is caused by the offset layout of the second catalyst to the one side can be securely supported by providing the first supporting member and the second supporting member on the both sides, in the cylinder row direction, of the second catalyst.

In the present description, an expression of "being substantially vertical to the direction of the cylinder row of the engine body" means "having an angle of 80-100° relative to the cylinder row direction of the engine body."

In another embodiment of the present invention, the heat insulating material has a third opening portion which is positioned upstream, in the exhaust-gas flowing direction, of the second catalyst and has a smaller opening area than the first opening portion and the second opening portion, and the second catalyst is further supported by a third supporting member which is provided through the third opening portion.

According to this embodiment, the support rigidity of the offset-arranged second catalyst can be improved by adding a reinforcing support conducted by the third supporting member in addition to suppressing the heat releasing.

In another embodiment of the present invention, a transmission is provided close to a first-opening-portion side of the second catalyst, and the first supporting member is attached to the transmission.

According to this embodiment, the length of the first supporting member can be properly shortened, and decreasing the support rigidity and weight increasing can be suppressed.

In another embodiment of the present invention, an EGR passage is connected to a downstream side, in the exhaust-gas flowing direction, of the second catalyst, the EGR passage is positioned between the second catalyst and a supporting body to which a base end of the first supporting member is attached, and the first supporting member is fixedly supported at the EGR passage at a middle portion thereof between a tip end thereof which is attached to the second catalyst and the base end thereof.

According to this embodiment, the size of the first supporting member can be made small by supporting the first supporting member by the EGR passage, thereby making the first opening portion properly small.

In another embodiment of the present invention, the second catalyst is a particulate filter, there is provided a pressure-difference detector to detect a difference in pressure between an upstream side and a downstream side, in the exhaust-gas flowing direction, of the particulate filter, and the pressure-difference detector is supported by the first supporting member.

According to this embodiment, since the pressure-difference detector is supported by using the first supporting member, it is unnecessary to provide another opening portion for supporting the pressure-difference detector at the heat insulating material, and also the compactness/layout performance of the device can be improved.

In another embodiment of the present invention, the engine is installed to a four-wheel drive vehicle provided with a power dividing device, the power dividing device is supported at the engine body via a fourth supporting member, and the second supporting member is attached to the fourth supporting member, whereby the second supporting member is supported at the engine body.

According to this embodiment, the supporting members for the second catalyst and the power dividing device can be commonly used, by attaching the second supporting member to the fourth supporting member, so that the compactness/layout performance can be improved.

In another embodiment of the present invention, the second catalyst is a particulate filter, there is provided a pressure-difference detector to detect a difference in pressure between an upstream side and a downstream side, in the exhaust-gas flowing direction, of the particulate filter, and the pressure-difference detector is supported by the third supporting member.

According to this embodiment, since the third supporting member can be commonly used as a support of the pressure-difference detector in addition to the exhaust device, the compactness/layout performance of the device can be improved.

Other features, aspects, and advantages of the present invention will become apparent from the following description which refers to the accompanying drawings.

DETAILED DESCRIPTION OF THE INVENTION

Figure 1:
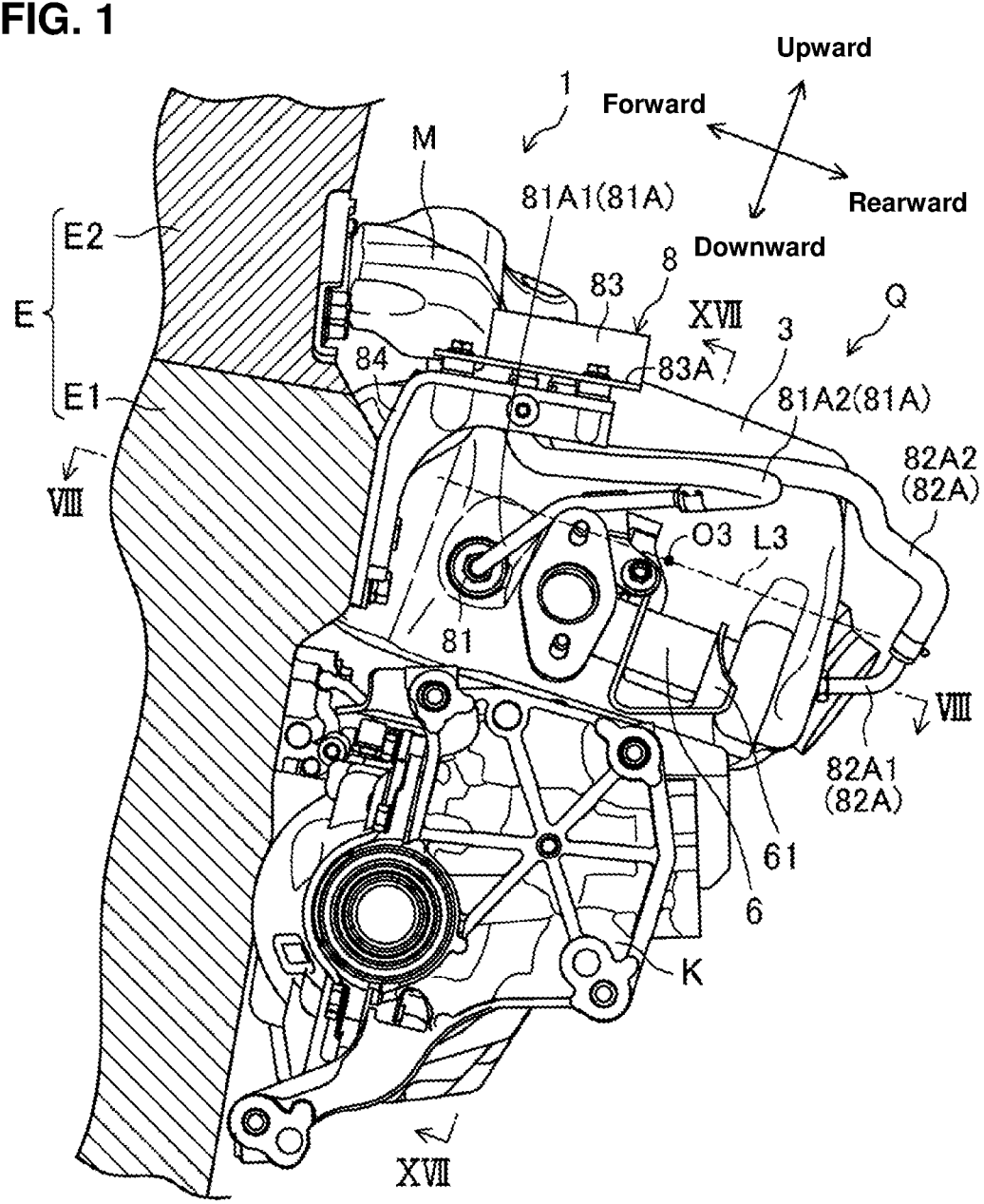
FIG. 1 is a schematic side view of an exhaust-gas purifying device according to an embodiment in a state where the exhaust-gas purifying device is attached to an engine body, when viewed from a leftward side.

Hereafter, an embodiment of the present invention will be described specifically referring to the drawings. The following descriptions about the preferred embodiment exemplify the present invention substantially and do not limit applications or usages of the present invention at all.

<Engine>

An engine, to which an exhaust-gas purifying device 1 according to the present embodiment is applied, is an in-line four-cylinder gasoline engine (in-line multi-cylinder engine) which is installed to a four-wheel drive vehicle. The engine is disposed laterally at a front portion of a FF vehicle.

Herein, the engine, to which the exhaust-gas purifying device 1 according to the present embodiment is applied, is not limited to this four-cylinder gasoline engine but the present exhaust-gas purifying device 1 is applicable to any other multi-cylinder engine or a diesel engine. Further, the present exhaust-gas purifying device 1 is applicable not only to the PP vehicle but to any other layout-type vehicles, such as a FR vehicle, a MR vehicle, a 4WD vehicle, including a motorcycle. Moreover, the present exhaust-gas purifying device 1 is applicable not only to the four-wheel drive vehicle but to a general two-wheel drive vehicle or any other multi-wheel drive vehicle.

The engine has an engine body E which comprises a cylinder block E1 and a cylinder head E2 as shown in FIG. 1. While detailed illustrations are omitted here, first through fourth cylinders which are formed by the cylinder block E1 and the cylinder head E2 are arranged in line in a direction vertical to a paper surface. A combustion chamber of each cylinder is formed by a cylinder bore (not illustrated) of the cylinder block E1, a piston (not illustrated) which is arranged inside the cylinder bore, and the cylinder head E2.

Four exhaust ports (not illustrated) which are respectively connected to the four combustion chambers are formed at the cylinder head E2. Exhaust gas which is generated inside the combustion chambers is discharged to the outside of the vehicle through an exhaust path including these exhaust ports.

<Exhaust Path>

Figure 2:
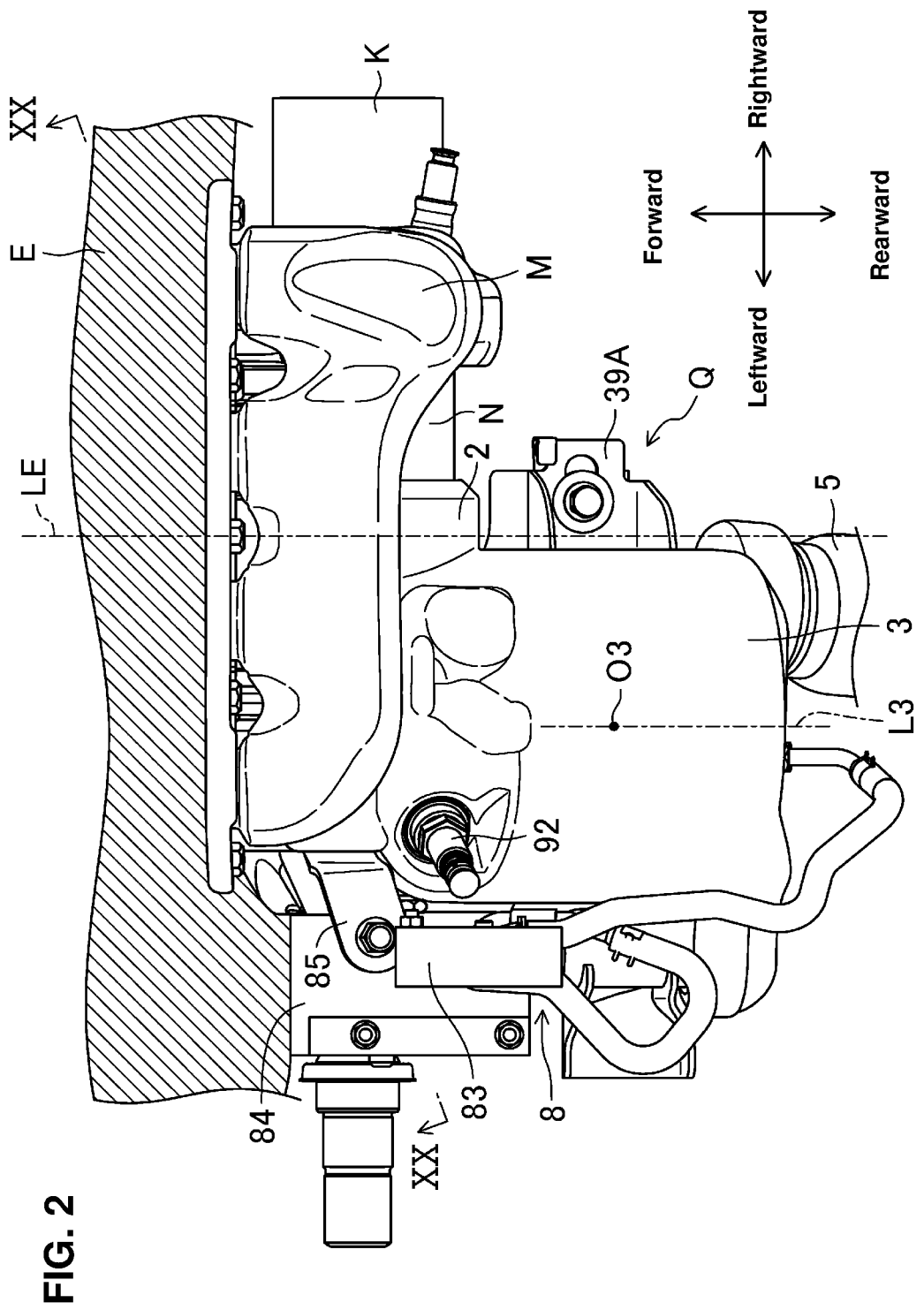
FIG. 2 is a schematic plan view of the device shown in FIG. 1.

As shown in FIGS. 1 and 2, the exhaust-gas purifying device 1 according to the present embodiment is connected to the above-described exhaust ports, and a downstream-side exhaust-gas passage (not illustrated) which is continuous to the vehicle outside is connected to a downstream side of the exhaust-gas purifying device 1. An exhaust path, to which the exhaust-gas purifying device 1 is applied, comprises the above-described exhaust ports, the exhaust-gas purifying device 1, and the downstream-side exhaust-gas passage.

<Exhaust-Gas Purifying Device>

The exhaust-gas purifying device 1 according to the present embodiment comprises, as shown in FIGS. 1 and 2, an exhaust manifold M which is connected to the four exhaust ports of the engine body E, a connection portion N which is connected to an outlet of the exhaust manifold M, and a catalyst device Q which is connected to an outlet of the connection portion N.

<Exhaust Manifold and Connection Portion>

As shown in FIGS. 1-7, the exhaust manifold M collects the exhaust gas discharged from the four combustion chambers through the exhaust ports and guides the exhaust gas to the downstream-arranged catalyst device Q. Independent exhaust pipes which are respectively connected to the four exhaust ports collect at a rightward side of the exhaust manifold M, thereby forming a collective portion which extends toward a downstream side. The exhaust gas in the exhaust manifold M is supplied to the catalyst device Q through the connection portion N which is connected to an outlet of the collective portion of the exhaust manifold M.

The connection portion N is a pipe member for guiding the exhaust gas supplied from the outlet of the collective portion of the exhaust manifold M to the catalyst device Q.

<Direction>

A "vertical direction" and a "longitudinal direction" which are used in the present description are, as shown in FIG. 1, defined based on the directions where the cylinder head E2 is positioned at an upward side of the engine body E, the cylinder block E1 is positioned at a downward side of the engine body E, and the exhaust manifold M is positioned on a rearward side of the engine body E. Further, a "lateral direction" means, as shown in FIG. 2, a direction of a cylinder row of the engine body E, in other words, a direction vertical to the paper surface of FIG. 1, where a near side means a leftward side and a far side means a rightward side. Moreover, an "upstream" and a "downstream" may mean respectively an "upstream side in the flowing direction of the exhaust-gas discharged from the combustion chamber through the exhaust port" and a "downstream side in the flowing direction of the exhaust-gas discharged from the combustion chamber through the exhaust port."

In the present embodiment, the "longitudinal direction" is parallel to a center axis L3 of a gasoline particulate filter 3 (hereafter, referred to as "GPF 3") as a particulate filter which will be described later, as shown in FIG. 1.

<Catalyst Device>

Figure 4:
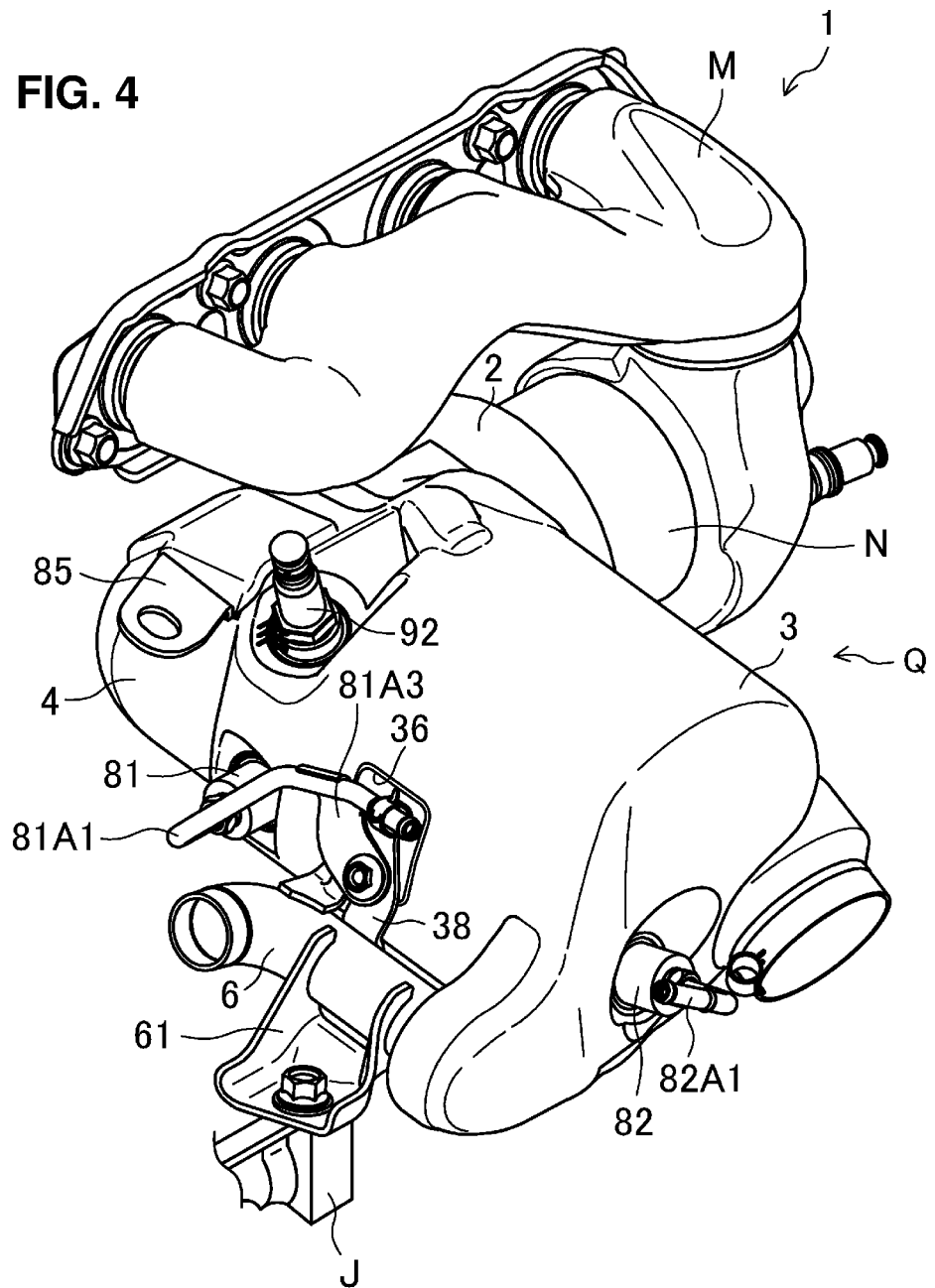
FIG. 4 is an enlarged view of the exhaust-gas purifying device shown in FIG. 3.

The catalyst device Q comprises, as shown in FIGS. 2 and 4, a three-way catalyst 2 as a first catalyst connected to the outlet of the connection portion N, the GPF 3 as a second catalyst which is arranged on the downward side of the three-way catalyst 2, a connecting pipe 4 as a connecting member which connects the three-way catalyst 2 and the GPF 3, a GPF terminal end portion 7 which is provided at a downward-side terminal end of the GPF 3, and an exhaust-gas discharge portion 5 and a takeout passage for EGR 6 which are respectively provided downstream of the GPF terminal end portion 7.

<Three-Way Catalyst>

The three-way catalyst 2 is a catalyst for purifying hydrocarbon HC, carbon monoxide CO, and nitrogen oxide NOx in the exhaust gas. While specific descriptions are omitted here, the three-way catalyst 2 is made by coating a catalyst component which is formed by carrying noble metal, such as Pt, Pd or Rh, to a metal-oxide made support onto a honeycomb carrier. The three-way catalyst 2 is not to be limited to this in particular, but any known type is applicable.

Figure 8:
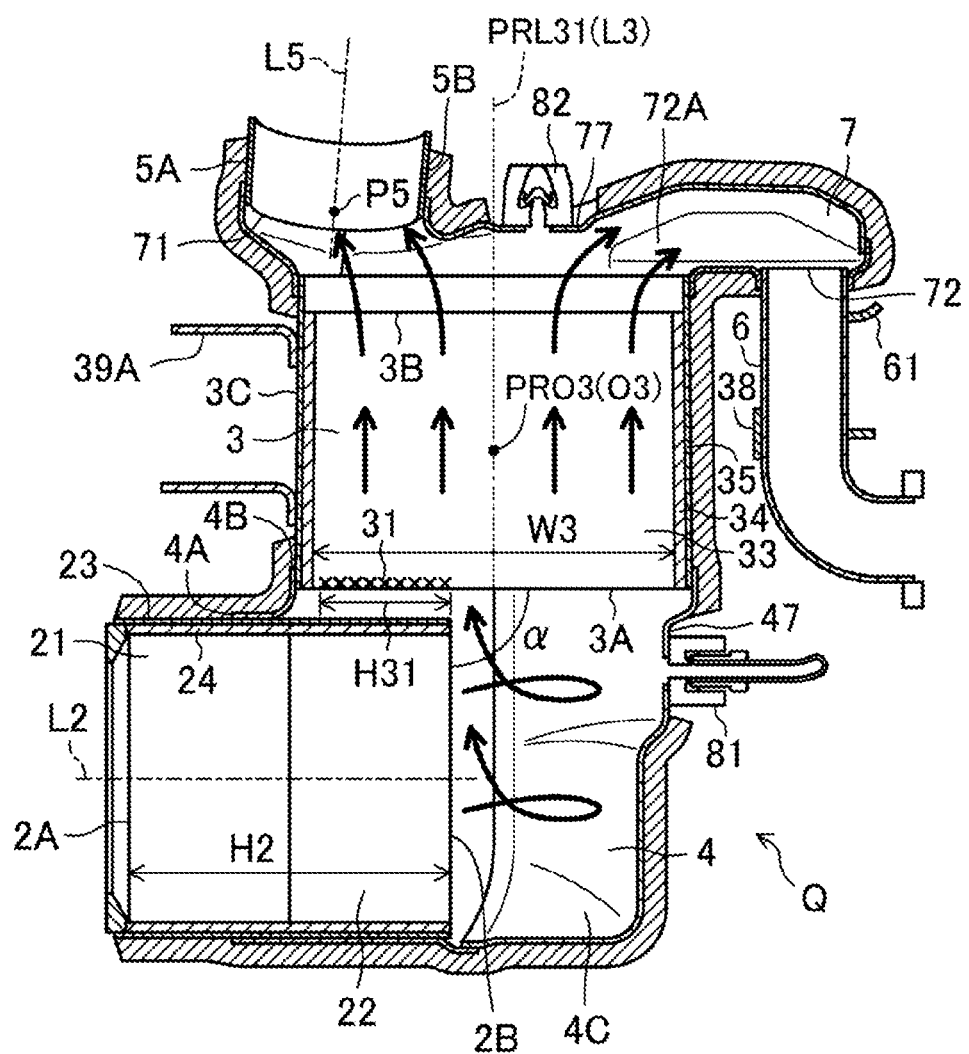
FIG. 8 is a sectional view taken along line VIII-VIII of FIG. 1.

As shown in FIGS. 2 and 8, the three-way catalyst 2 is a cylinder-shaped catalyst having a center axis L2 of the catalyst. The shape of the three-way catalyst 2 is not limited in particular, but the cylindrical shape is preferable in arranging it in the exhaust path and providing a uniform exhaust-gas flowing. A shape of a cross section of the three-way catalyst 2 which is vertical to the center axis L2 is not limited in particular, but any shape, such as a complete round shape, an oval shape, a rectangular shape, or a polygonal shape, is applicable. However, the complete round shape or the oval shape may be preferable in providing the uniform exhaust-gas flowing and reducing a manufacturing cost.

Herein, as shown in FIG. 8, an end face of the upstream side of the three-way catalyst 2 is a three-way-catalyst starting end face 2A (a starting end face of the first catalyst), and an end face of the downstream side of the three-way catalyst 2 is a three-way-catalyst terminal end face 2B (a terminal end face of the first catalyst). The three-way-catalyst starting end face 2A and the three-way-catalyst terminal end face 2B are of a circular shape having the same diameter.

As shown in FIG. 8, the three-way catalyst 2 has a two-step structure which comprises a front step portion 21 which is arranged on the upstream side and a rear step portion 22 which is arranged on the downstream side as a catalyst body for purifying the exhaust gas. The front step portion 21 is a three-way catalyst which is excellent in low temperature activity for purifying the low-temperature exhaust gas during a low-load engine operation. The rear step portion 22 is a three-way catalyst which is excellent in high temperature activity for purifying the high-temperature exhaust gas during a high-load engine operation. While the catalyst 2 is the two-step structure comprising the front step portion 21 and the rear step portion 22 according to the present embodiment, any type of catalyst structure, such as single catalyst structure or a three or more split structure, is applicable.

Further, as shown in FIG. 8, the three-way catalyst 2 comprises a catalyst mat 23 which covers over an outer periphery of the front step portion 21 and the rear step portion 22 as the catalyst body and a catalyst case 24 which covers over an outer periphery of the catalyst mat 23.

The exhaust-gas temperature is a low gas temperature of about 400° C. during the low-load operation and is a high gas temperature of about 800° C. during the high-load operation. In a case where the three-way catalyst 2 is always exposed to the high-temperature exhaust gas flowing down through the three-way catalyst 2, there is a concern that the three-way catalyst 2 may be deteriorated by heat damage.

The catalyst mat 23 stably holds the front step portion 21 and the rear step portion 22 as the catalyst body even under an environment where the catalyst body is exposed to the high-temperature exhaust gas, and this mat 23 is made of a material having highly heat resistant properties and heat retaining properties, such as ceramic.

The catalyst case 24 holds the front step portion 21 and the rear step portion 22 of the three-way catalyst 2 and the catalyst mat 23, and this case 24 is made of metal, such as stainless steel or iron. Herein, any other known material can be applied for the catalyst mat 23 and the catalyst case 24.

<GPF>

The GPF 3 is arranged on the downstream side of the three-way catalyst 2, which is a filter for trapping particulate matters (hereafter, referred to as "PM") in the exhaust gas passing through the three-way catalyst 2. While specific descriptions are omitted here, the GPF 3 is made by applying sealing to the honeycomb carrier or the like so as to add the filter performance, for example. A catalyst coating is applied for promoting burning of the PM accumulating at the filter. When the PM contained in the exhaust gas are trapped at a surface of a partition wall of the GPF 3 and the PM accumulate, a post injection of fuel is conducted after a main fuel injection in order to increase the burning temperature of the PM, for example, thereby burning and removing the PM accumulating at the GPF 3. The GPF 3 is not limited to the above-described structure, but any known structure is applicable.

As shown in FIGS. 1 and 2, the GPF 3 is a cylinder-shaped catalyst having its center axis L3. The shape of the GPF 3 is not limited in particular, but the cylindrical shape is preferable in easily arranging the GPF 3 in the exhaust path and providing a uniform exhaust-gas flowing. A shape of a cross section of the GPF 3 which is vertical to the center axis L3 is not limited in particular, but any shape, such as a complete round shape, an oval shape, a rectangular shape, or a polygonal shape, is applicable. However, the complete round shape or the oval shape are preferable in providing the uniform exhaust-gas flowing and reducing a manufacturing cost.

FIG. 8 shows the cross section of the three-way catalyst 2 which includes the center axis L2 and is parallel to the center axis L3 of the GPF 3, when viewed from an upward side.

As shown in FIG. 8, an end face of the upstream side of the GPF 3 is a GPF starting end face 3A (a starting end face of the second catalyst), and an end face of the downstream side of the GPF 3 is a GPF terminal end face 3B (a terminal end face of the second catalyst). The GPF starting end face 3A and the GPF terminal end face 3B are of a circular shape having the same diameter.

As shown in FIGS. 1, 2 and 8, a point which is positioned on the GPF center axis L3 and also positioned at a center between the GPF starting end face 3A and the GPF terminal end face 3B shows a GPF center O3 (the center of the second catalyst). In FIG. 8, a projection line and a projection point of the GPF center axis L3 and the GPF center O3 which are projected on the VIII-VIII cross section are denoted by reference characters PRL31, PRO3, respectively.

Herein, as shown in FIG. 2, the GPF 3 is arranged substantially in a direction vertical to the cylinder row direction of the engine body E, i.e., the lateral direction.

Further, the GPF 3 is arranged such that its GPF center O3 is offset leftward (to one side) from a center, in the cylinder row direction, of the cylinder row of the engine body E, i.e., a cylinder-row-direction central flat-face LE which is positioned at a center between a second cylinder (not illustrated) and a third cylinder (not illustrated).

Herein, in the present description, the expression of "being substantially vertical to the direction of the cylinder row of the engine body" means "having the angle of 80-100° relative to the cylinder row direction of the engine body E".

Further, similarly to the three-way catalyst 2, the GPF 3 comprises a GPF catalyst body for purifying the exhaust gas 33, a GPF catalyst mat 34 which covers over an outer periphery of the GPF catalyst body 33, and a GPF catalyst case 35 which covers over an outer periphery of the GPF catalyst mat 34. The GPF catalyst mat 34 and the GPF catalyst case 35 can be used for the similar purpose to the catalyst mat 23 and the catalyst case 24 and have the similar structure to the catalyst mat 23 and the catalyst case 24.

<Connecting Pipe>

The connecting pipe 4 is a tube-shaped member which is formed in an L-shaped bent shape and connects the three-way catalyst 2 and the GPF 3, which forms a portion of the exhaust-gas passage.

As shown in FIG. 8, the connecting pipe 4 comprises a first opening 4A which is positioned on the upstream side, a second opening 4B which is positioned on the downstream side, and a bending portion 4C which connects the first opening 4A and the second opening 4B.

<Relative Arrangement of Three-Way Catalyst and GPF>

As shown in FIG. 8, the three-way-catalyst terminal end face 2B of the three-way catalyst 2 and the GPF starting end face 3A of the GPF 3 are provided such that a two-face angle α is about 90 degrees at the bending portion 4C. This two-face angle α is not limited to this angle, but in securing the exhaust-gas flowing from the three-way catalyst 2 to the GPF 3 sufficiently, an angle of 60-120 degrees is preferable, an angle of 70-110 degrees is more preferable, and an angle of 80-100 degrees is particularly preferable.

In addition, the GPF starting end face 3A of the GPF 3 has an overlap portion 31 which is covered with a side face of the three-way catalyst 2.

By forming this overlap portion 31 as described above, the three-way catalyst 2 and the GPF 3 can be arranged compactly.

Herein, as shown in FIG. 8, a length H31 of the side face of the three-way catalyst 2 which forms the overlap portion 31 relative to a whole length H2 of the three-say catalyst 2 is preferably 10 to 50%. Further, the length H31 of the side face of the three-way catalyst 2 relative to a width W3 of the GPF 3 is preferably 10 to 50%.

Thus, by setting an area of the overlap portion 31 of the GPF 3 with the three-way catalyst 2 within the above-described range in the case where the three-way catalyst 2 and the GPF 3 are arranged mutually in the lateral direction, the exhaust-gas purifying device 1 can be made properly compact and also an use (utilization) efficiency of the GPF 3, in particular the overlap portion 31, can be properly improved.

Further, by providing the GPF 3 to be offset leftward from the flat face LE as shown in FIG. 2, both the overlap portion 31 and a non-overlap portion where there is no overlap can be provided, thereby improving the use efficiency of the GPF 3.

As shown in FIG. 8, a step portion 47 is formed at a wall of the connecting pipe 4 which is closer to the GPF 3. An upstream-side pressure takeout portion 81 of a pressure-difference detecting device 8 (pressure-difference detector), which will be described later, is provided at this step portion 47.

Further, a NOx sensor 92 is provided at an upper side of the connecting pipe 4 as shown in FIG. 2, for example.

Herein, a control device for other various sensors than the upstream-side pressure takeout portion 81 and the NOx sensor 92 may be provided at the connecting pipe 4.

As shown by solid-line arrows in FIG. 8, the exhaust gas which has passed through the three-way catalyst 2 flows, winding up, along a wall face of the connecting pipe 4, and fills the connecting pipe 4 and then flows out into the GPF 3. Herein, since the upstream side of the connecting pipe 4 or the vicinity of the step portion 47 are spaced apart from the three-way catalyst 2 or the exhaust gas flowing from the three-way catalyst 2 does not directly contact the upstream side of the connecting pipe 4 or the vicinity of the step portion 47, there occurs a situation where the exhaust gas, a flowing speed of which has decreased, fills this area. Accordingly, the exhaust-gas flow does not affect the detection (sensing) very much, so that the stable detection (sensing) accuracy can be secured.

<GPF Terminal End Portion>

As shown in FIG. 8, the GPF terminal end portion 7 is provided at the terminal end side of the GPF 3. At this GPF terminal end portion 7 are provided an exhaust-gas outlet 71 which attaches the exhaust-gas discharge portion 5 as the outlet of the exhaust gas passing through the GPF 3 (see FIG. 2) and an inlet for guiding EGR 72 which attaches the takeout passage for EGR 6 to a supply part of the exhaust gas to an intake side.

<Exhaust Gas Outlet>

The exhaust-gas discharge portion 5 guides the exhaust gas passing through the GPF 3 to a downstream-side exhaust-gas passage, not illustrated, and reserves and drains water which is accompanied by the purification of the exhaust gas by means of the three-way catalyst 2 and the GPF 3.

A line denoted by a reference character L5 in FIG. 8 shows a center axis of the exhaust-gas discharge portion 5. A point denoted by a reference character P5 shows a center of the exhaust-gas outlet 71, which will be referred to as the center position P5 of the exhaust-gas discharge portion 5 in the following description.

As shown in FIG. 8, the center position P5 is offset rightward, i.e., toward the three-way catalyst 2, from the projection line PRL31.

According to the present structure, as shown by the solid-line arrows in FIG. 8, the exhaust gas flowing into the GPF 3 generates a gas flow flowing toward the exhaust-gas discharge portion 5. Thereby, the amount of exhaust gas flowing down to the overlap portion 31 is increased. Thus, the use efficiency of the GPF 3 can be improved.

Herein, as shown in FIG. 8, the offset quantity of the exhaust-gas discharge portion 5 can be preferably set so that an exhaust-gas discharge portion right-side face 5A of the exhaust-gas discharge portion 5, which is positioned on the side of the three-way catalyst 2, is located on the rightward side, i.e., on the side of the three-way catalyst 2, of a GPF side face 3C of the GPF 3, which is positioned on the side of the three-way catalyst 2, on the VIII-VIII cross section from aspects of improving the use efficiency of the GPF 3 by sufficiently securing the amount of the exhaust gas flowing into the overlap portion 31. In this case, it is preferable, from aspects of suppressing an increase of flow resistance around the exhaust-gas discharge portion 5, that the offset quantity of the exhaust-gas discharge portion 5 be set so that an exhaust-gas discharge portion left-side face 5B of the exhaust-gas discharge portion 5 which is positioned on the leftward side is located on the leftward side of the GPF side face 3C of the GPF 3 which is positioned on the side of the three-way catalyst 2 on the VIII-VIII cross section.

<Takeout Passage for EGR>

The EGR for circulating part of the exhaust gas toward the intake side is applied as a structure of the engine for the purpose of preventing an occurrence of nocking or reducing the amount of nitrogen oxide NOx. The takeout passage for EGR 6 (EGR passage) of the exhaust gas is provided on the side of the GPF terminal end face 3B of the GPF 3.

Specifically, the inlet for guiding EGR 72 and an exhaust-gas guiding passage for EGR 72A for guiding the exhaust gas to the inlet for guiding EGR 72 are formed at a position of the GPF terminal end portion 7 which is spaced apart from the exhaust-gas outlet 71. The takeout passage for EGR 6 is connected to the inlet for guiding EGR 72. Herein, as shown in FIG. 8, the exhaust-gas guiding passage for EGR 72A, the inlet for guiding EGR 72, and the takeout passage for EGR 6 are arranged on an opposite side to the exhaust-gas discharge portion 5 relative to the projection line PRL31. Thereby, as shown by the solid-line arrows in FIG. 8, the sufficient amount of exhaust gas can be secured for the EGR and also the EGR-gas flow in the GPF can be dispersed laterally and be uniform, thereby further improving the use efficiency, the function, and the performance of the GPF 3.

A downstream-side step portion 77 is provided between the exhaust-gas outlet 71 and the exhaust-gas guiding passage for EGR 72A. At this downstream-side step portion 77 is provided a downstream-side pressure takeout portion 82 of the pressure-difference detector 8, which will be described later. The vicinity of the downstream-side step portion 77 is close to a position where the flow of the exhaust gas is divided into the side of the exhaust-gas outlet 71 and the side of the exhaust-gas guiding passage for EGR 72A, where the flow speed of the exhaust gas tends to be mild and uniform. Accordingly, the pressure of the exhaust gas can be taken out without being affected by the exhaust-gas pressure change very much.

<Pressure-Difference Detector>

As shown in FIGS. 1 and 2, the GPF 3 is provided with a pressure-difference detector 8 to detect a pressure difference of the exhaust gas between an upstream side and a downstream side of the GPF 3.

The pressure-difference detector 8 calculates the amount of the PM accumulating at the GPF 3 from the detected pressure difference of the exhaust gas.

Figure 6:
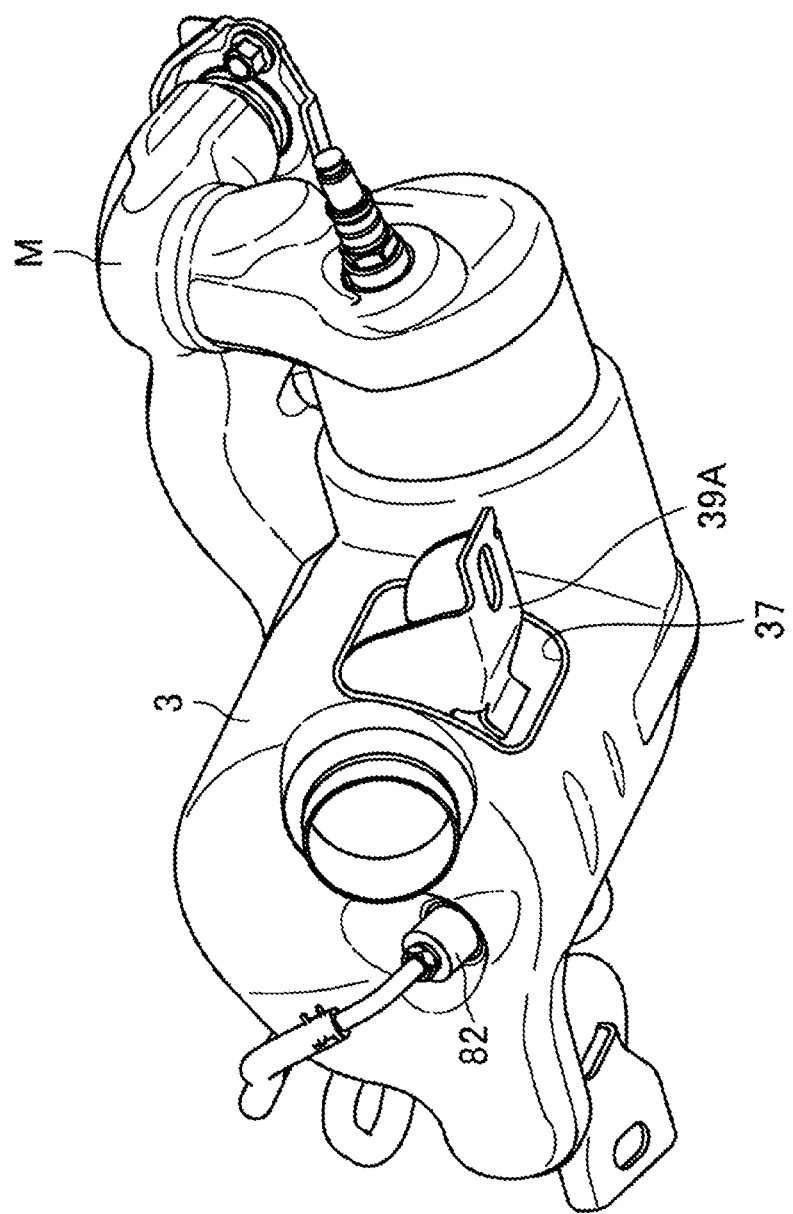
FIG. 6 is an enlarged view of the exhaust-gas purifying device shown in FIG. 5.

The pressure-difference detector 8 comprises, as shown in FIGS. 1 and 6, the upstream-side pressure takeout portion 81 which takes out the pressure of the exhaust gas on the upstream side of the GPF 3, the downstream-side pressure takeout portion 82 which takes out the pressure of the exhaust gas on the downstream side of the GPF 3, and a pressure-difference sensor 83 to detect the pressure difference between the upstream side and the downstream side of the GPF 3 from the pressures taken out by the upstream-side pressure takeout portion 81 and the downstream-side pressure takeout portion 82. The upstream-side pressure takeout portion 81 is provided at the step portion 47 as shown in FIG. 8. Meanwhile, the downstream-side pressure takeout portion 82 is provided at the downstream-side step portion 77 of the GPF terminal end portion 7 as described above. The upstream-side pressure takeout portion 81 and the pressure-difference sensor 83 are connected by an upstream-side pressure takeout passage 81A. The downstream-side pressure takeout portion 82 and the pressure-difference sensor 83 are connected by a downstream-side pressure takeout passage 82A. Herein, as shown in FIG. 1, the upstream-side pressure takeout passage 81A comprises an upstream-side pressure takeout pipe 81A1 and an upstream-side pressure takeout pipe 81A2 which is connected to the upstream-side pressure takeout pipe 81A1. The downstream-side pressure takeout passage 82A comprises a downstream-side pressure takeout pipe 82A1 and a downstream-side pressure takeout pipe 82A2 which is connected to the downstream-side pressure takeout pipe 82A1.

<Arrangement in Vehicle Body>

Figure 3:
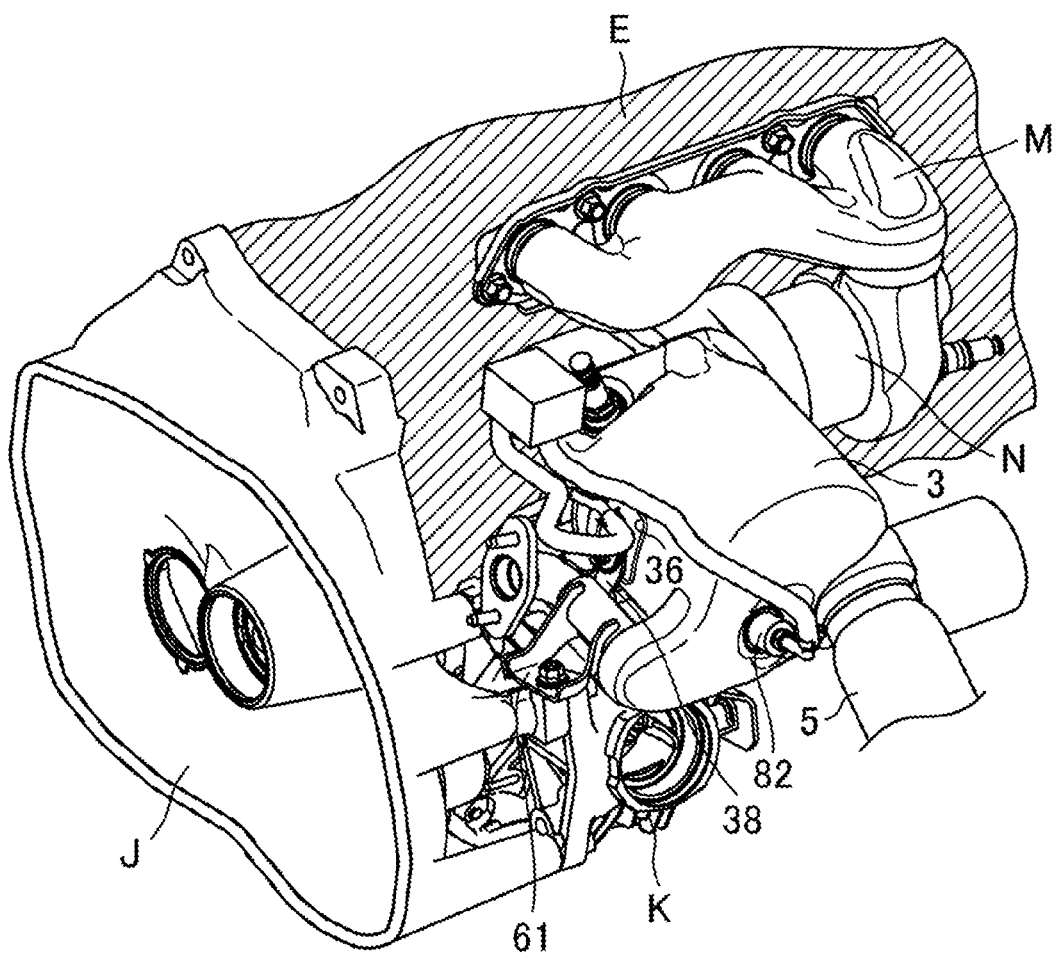
FIG. 3 is a schematic perspective view of the exhaust-gas purifying device according to the embodiment in the state where the exhaust-gas purifying device is attached to the engine body, when viewed from an upper-left rearward side.

The exhaust-gas purifying device 1 of the present embodiment can be installed to a vehicle layout shown in FIG. 3 and others, for example.

Figure 5:
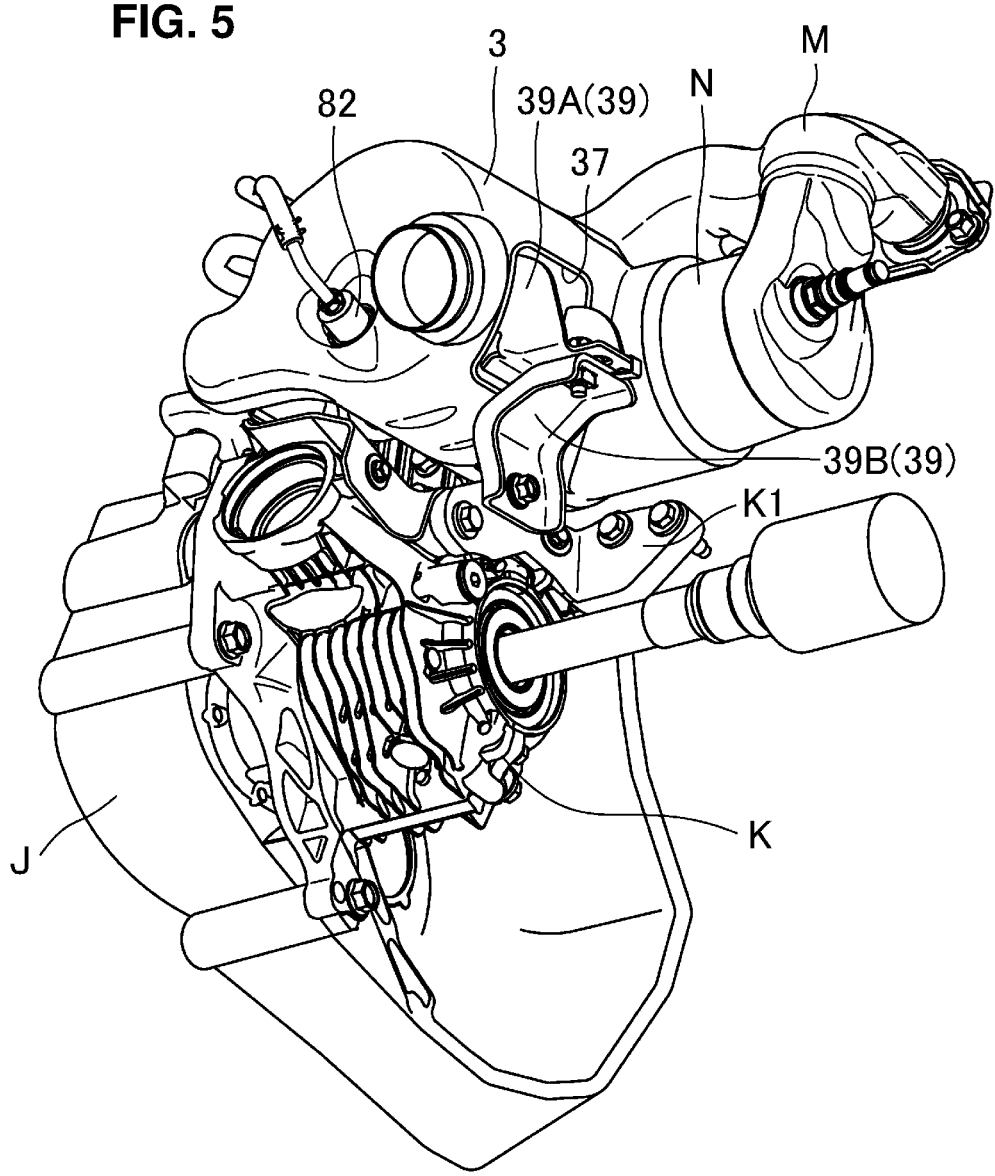
FIG. 5 is a schematic perspective view of the exhaust-gas purifying device and its surrounding components according to the embodiment, when viewed from a lower-right rearward side.

Specifically, as shown in FIG. 3, a transmission J (supporting body) is arranged closely to a leftward side (a side of the first opening portion) of the GPF 3. As shown in FIGS. 1, 3, 5 and others, a power dividing device K is arranged below the connecting pipe 4 and the GPF 3, adjacently to the transmission J.

By arranging the exhaust manifold M above the three-way catalyst 2 closely, connecting the three-way catalyst 2 and the GPF 3 by the L-shaped connecting pipe 4, and providing the overlap portion 31, the exhaust-gas purifying device 1 can be made more compact in the longitudinal direction, for example. Further, the vehicle layout can be more compact in the longitudinal, lateral, and vertical directions, including the layout of the transmission J and the power dividing device K.

Herein, vehicle components arranged around the exhaust-gas purifying device 1 are not limited to the transmission J or the power dividing device K. For example, an engine auxiliary device or a drive shaft of a driving system, an engine mount of a mount system in a case where the exhaust-gas purifying device 1 is applied to the FR vehicle or the like, and so on can be arranged as such vehicle components.

Figure 7:
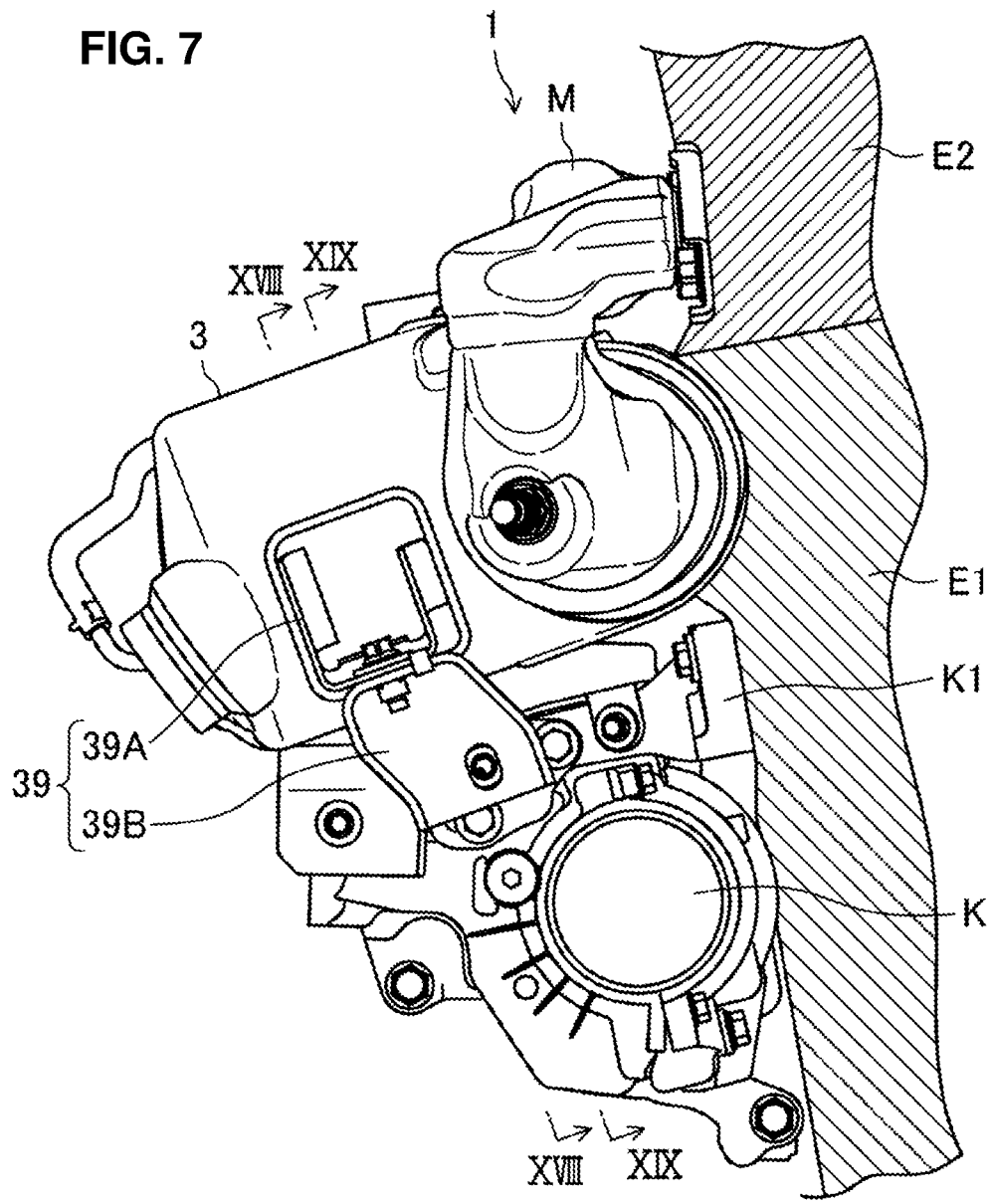
FIG. 7 is a schematic side view of the exhaust-gas purifying device according to the embodiment in the state where the exhaust-gas purifying device is attached to the engine body, when viewed from a rightward side.

Herein, as shown in FIG. 3, the transmission J is directly fixed to the engine body E. Further, as shown in FIG. 7, the drive dividing device K is supported at the engine body E via a power-dividing-device supporting member K1 (a fourth supporting member).

<Heat Insulating Material>

As shown in FIGS. 1-8, an almost whole part of the exhaust-gas purifying device 1, that is, the exhaust manifold M, the three-way catalyst 2, the GPF 3, and the connecting pipe 4, in particular, are covered with a heat insulating material 10.

The heat insulating material 10 suppresses a decrease of the temperature of the exhaust gas flowing in the exhaust-gas purifying device 1, suppresses an excessive heat radiation to the engine room, or reduces a surrounding noise.

The heat insulating material 10 is made of a highly heat-resistant material having the heat insulation performance, such as glass, silica, or alumina.

The structure of the heat insulating material 10 is shown in FIGS. 9-16. The heat insulating material 10 is divided into an upstream-side heat insulating material 101 which covers the exhaust manifold M and a downstream-side heat insulating material 102 which covers the catalyst device Q. Herein, the heat insulating material 10 may be configured such that it is not divided into the upstream-side heat insulating material 101 and downstream-side heat insulating material 102, but it covers the whole part from the exhaust manifold M to the catalyst device Q. Further, the heat insulating material 10 may be configured such that it is divided into more parts in accordance with the vehicle layout.

Figure 9:
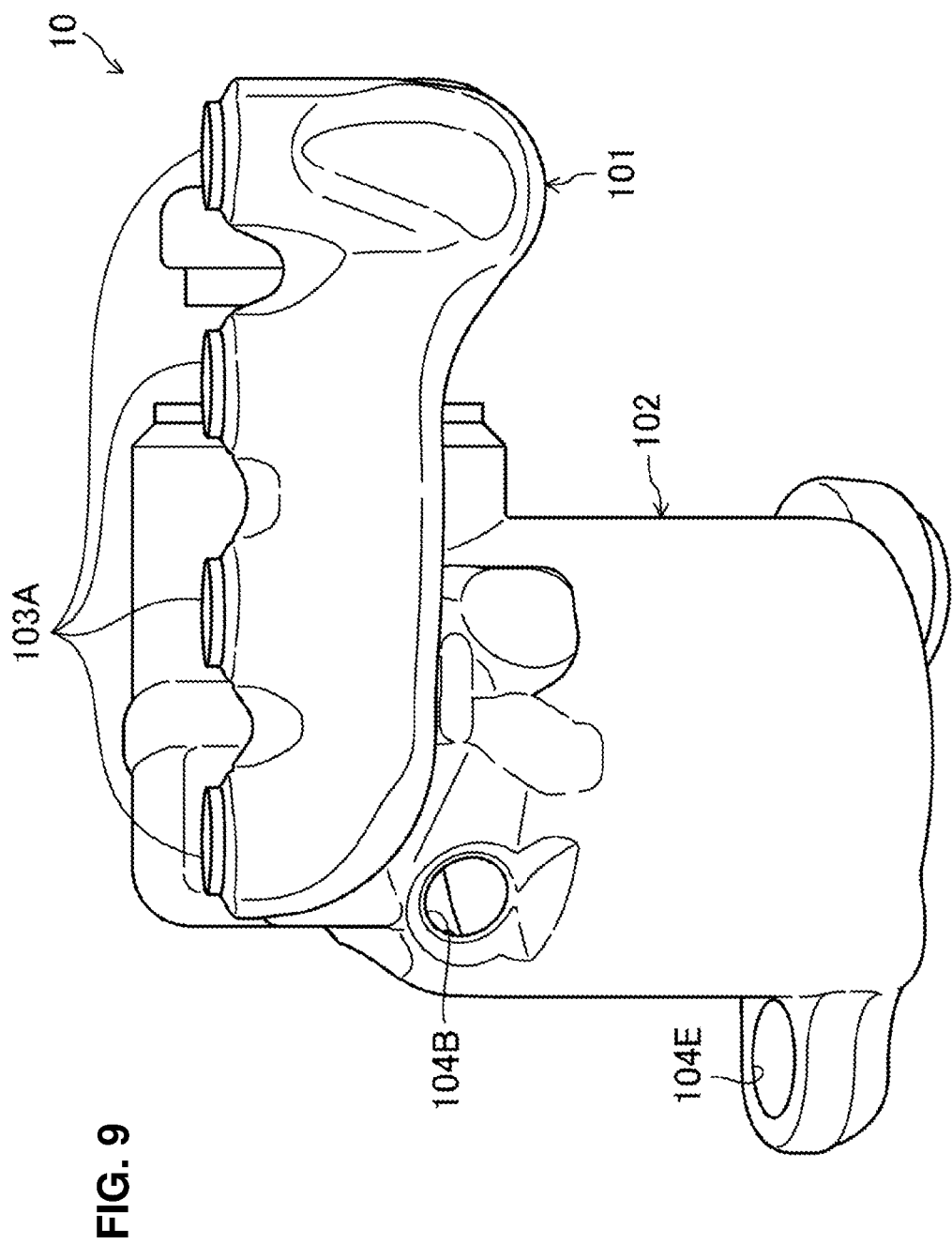
FIG. 9 is a plan view of a heat insulating material.
Figure 10:
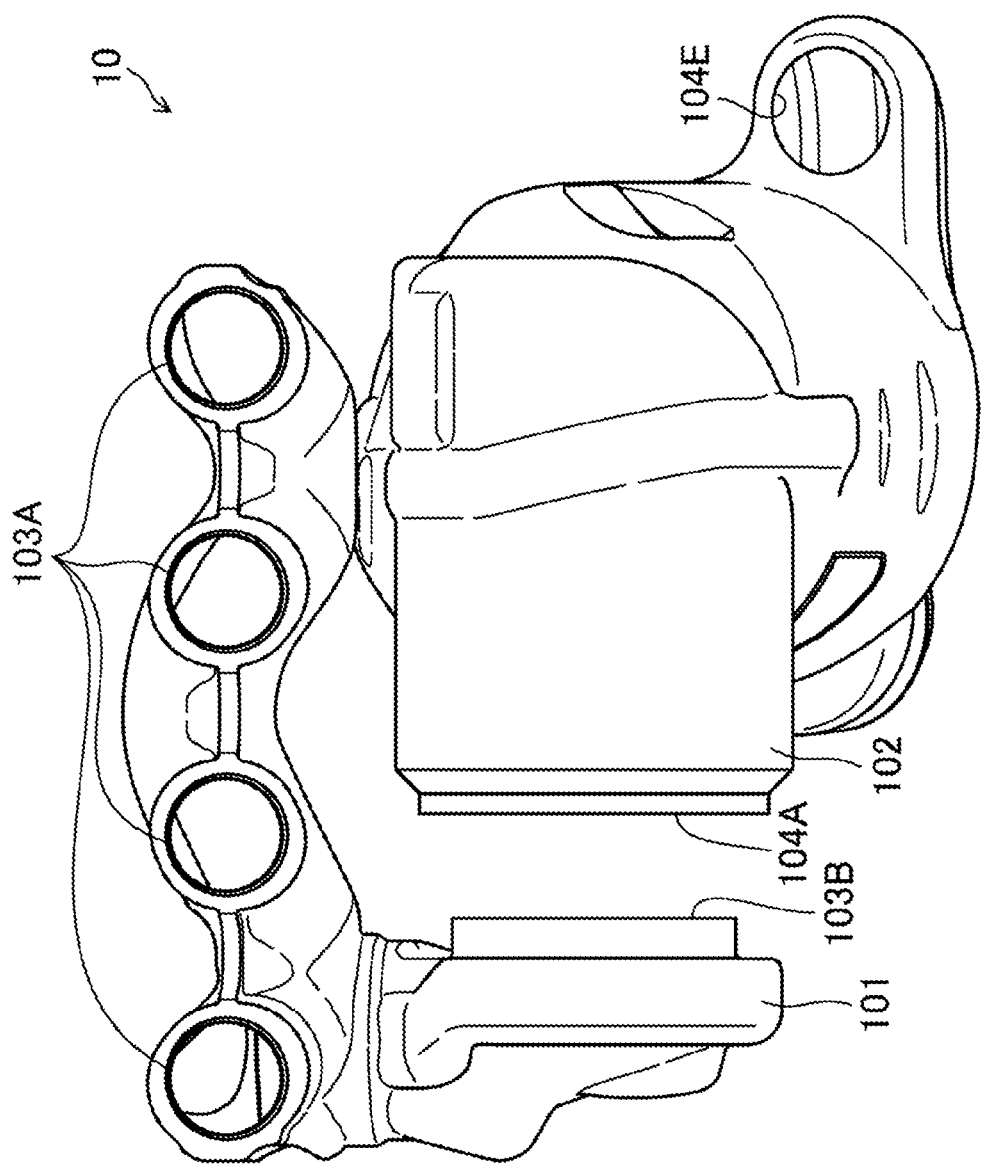
FIG. 10 is a front view of the heat insulating material.
Figure 12:
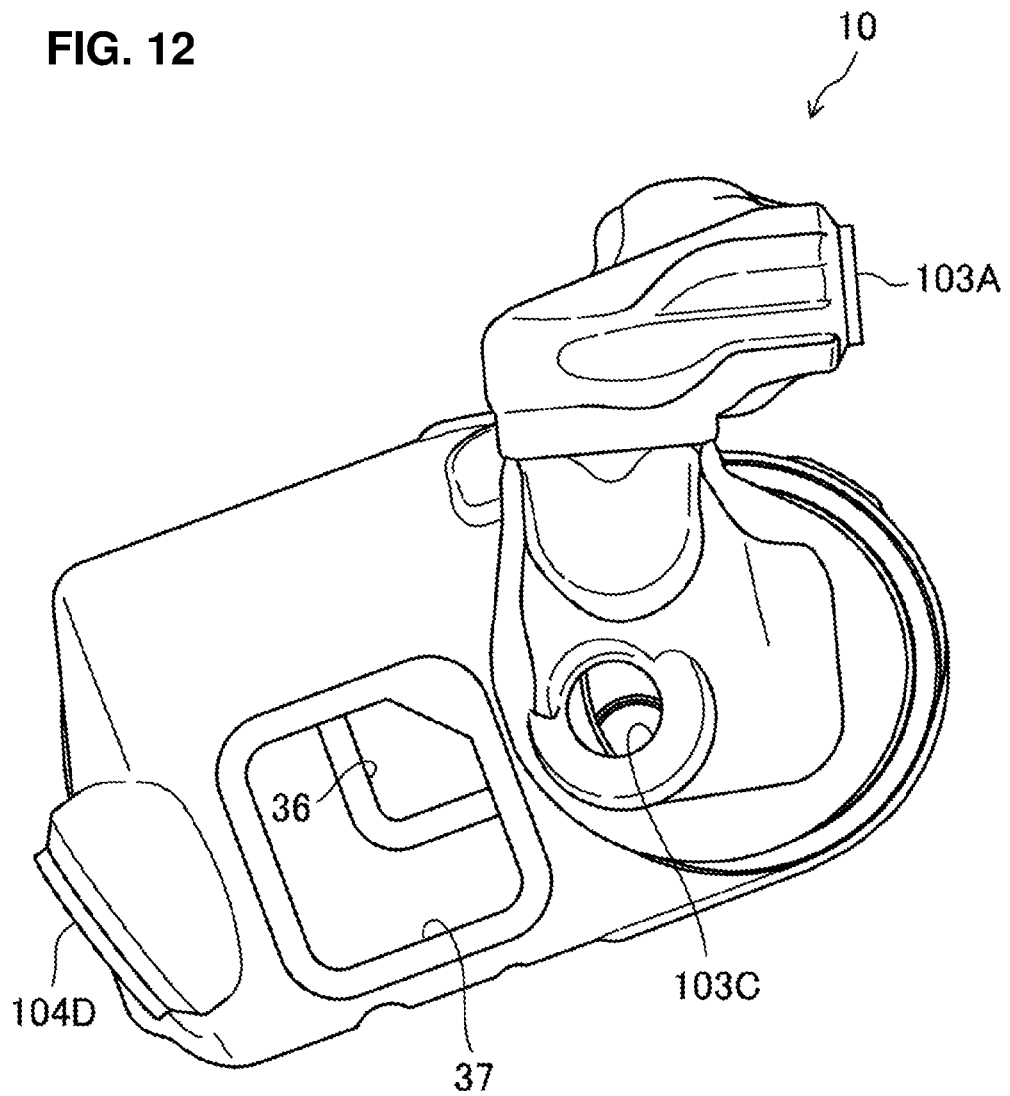
FIG. 12 is a right side view of the heat insulating material.
Figure 13:
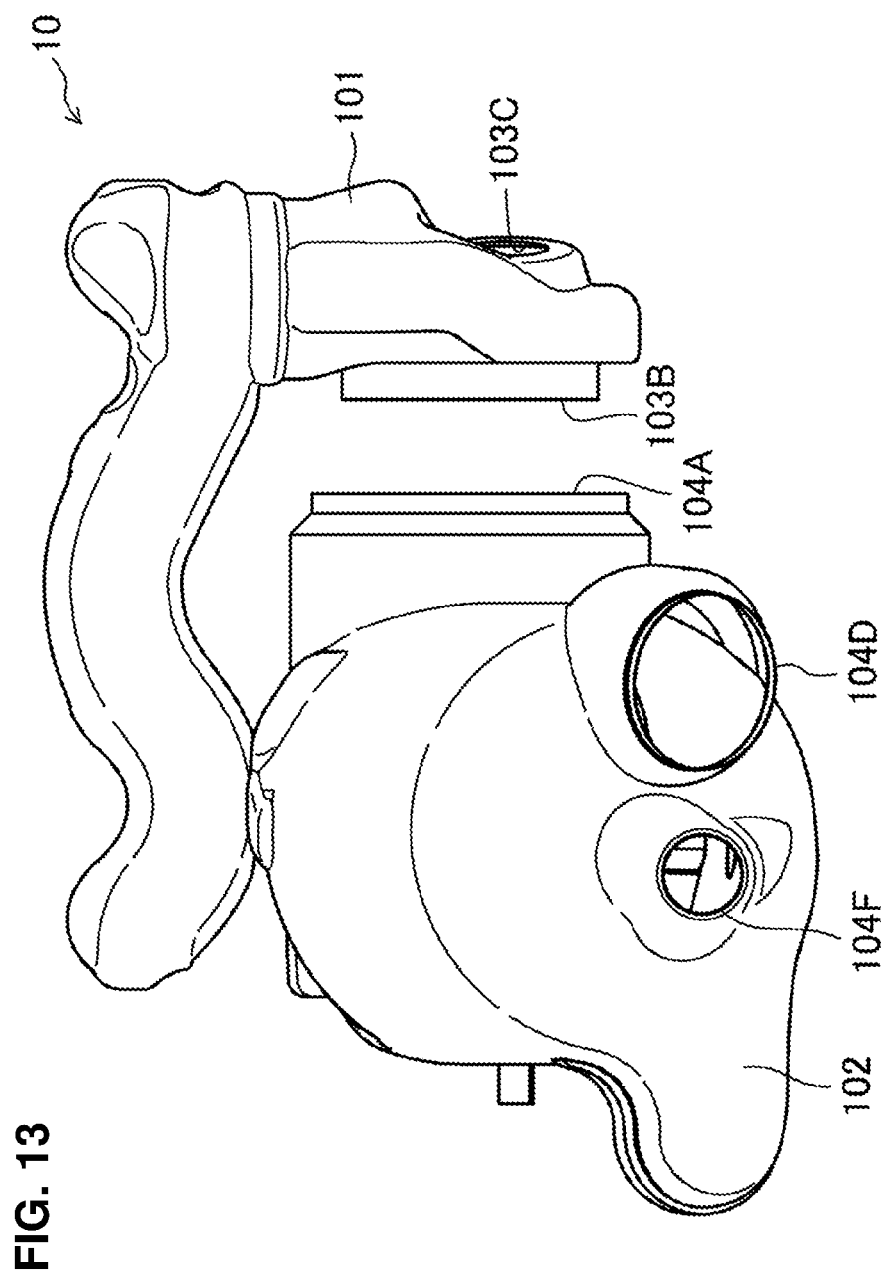
FIG. 13 is a back view of the heat insulating material.
Figure 14:
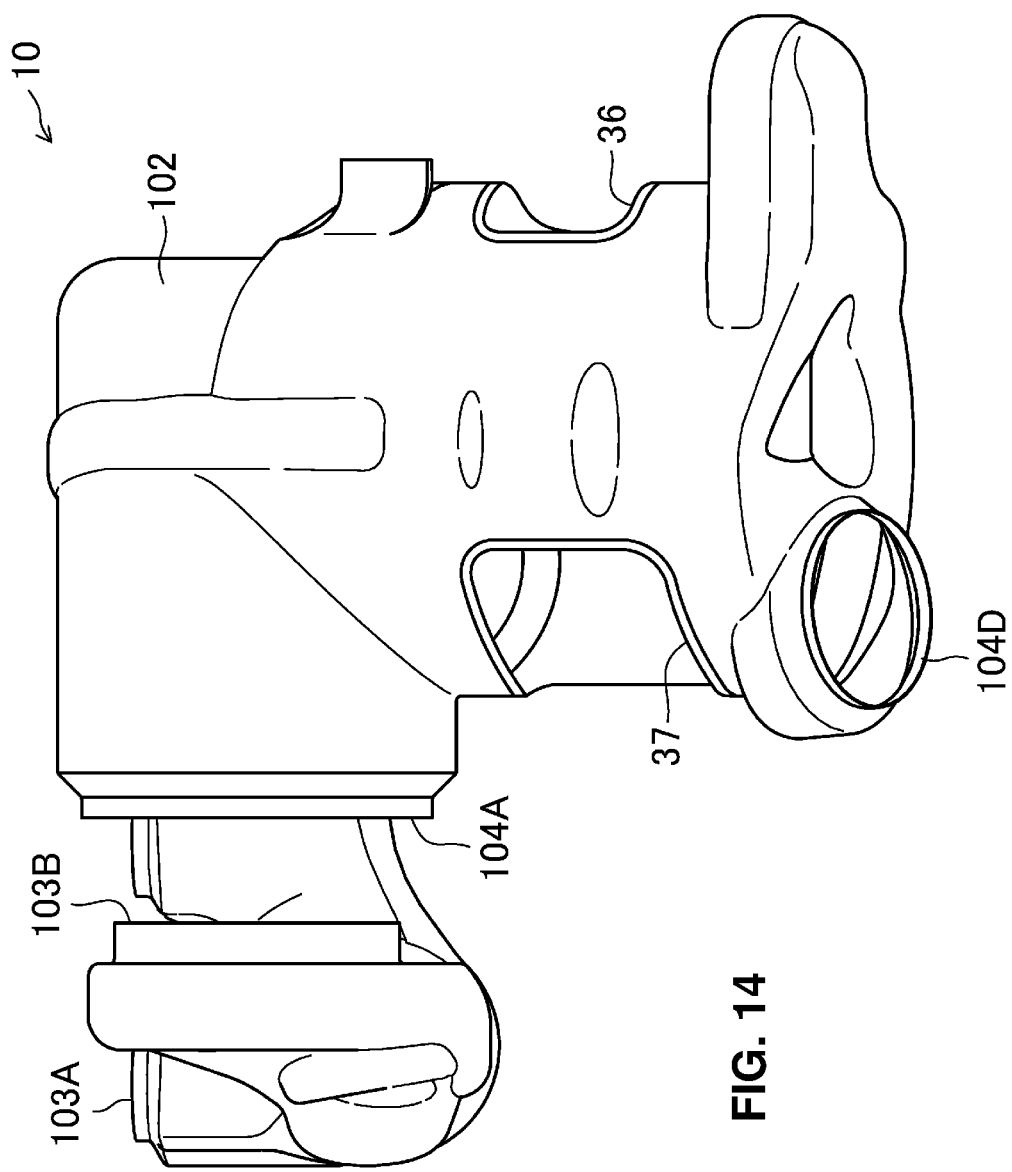
FIG. 14 is a lower view of the heat insulating material.
Figure 15:
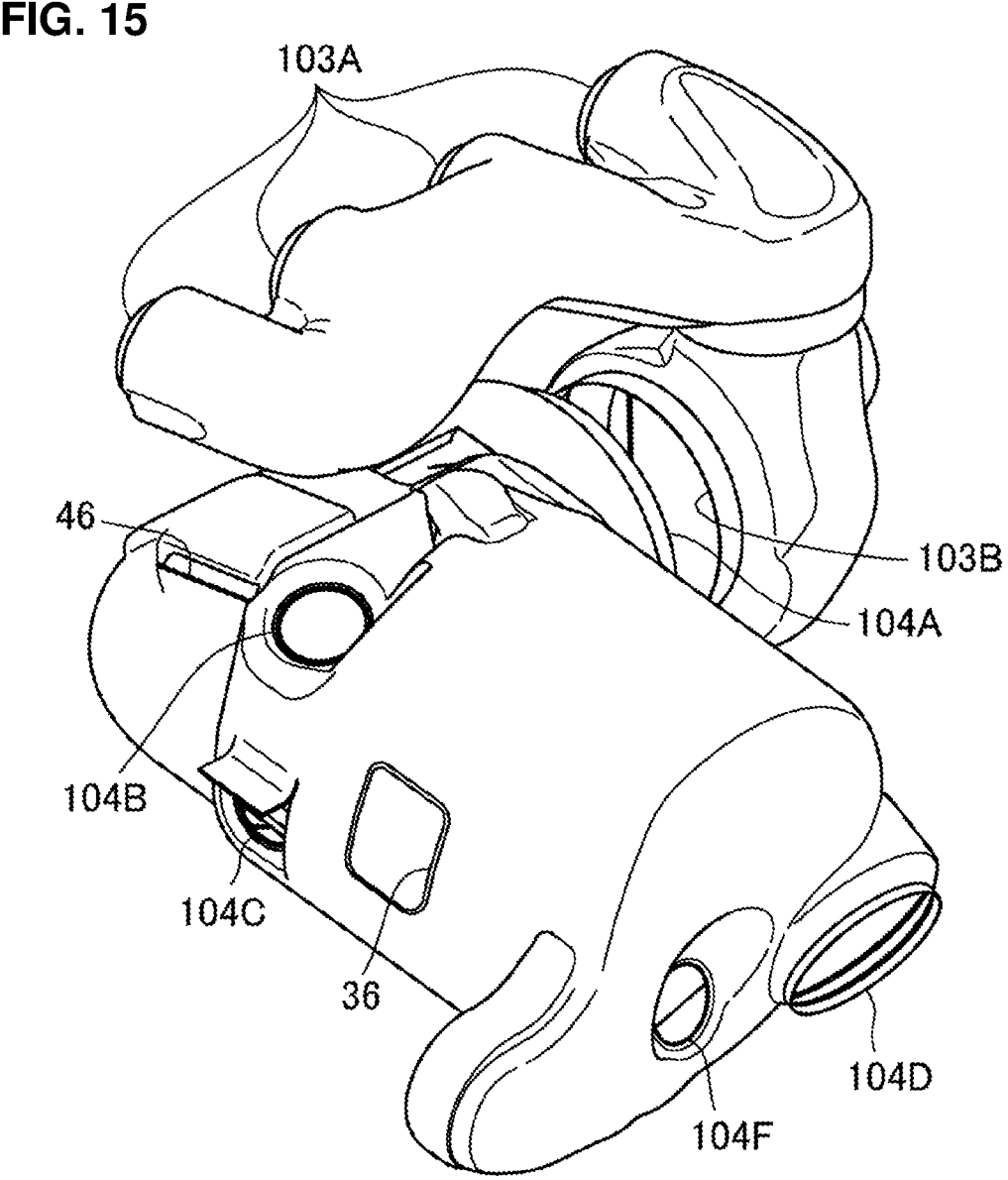
FIG. 15 is a perspective view of the heat insulating material, when viewed from a upper-left rearward side.
Figure 16:
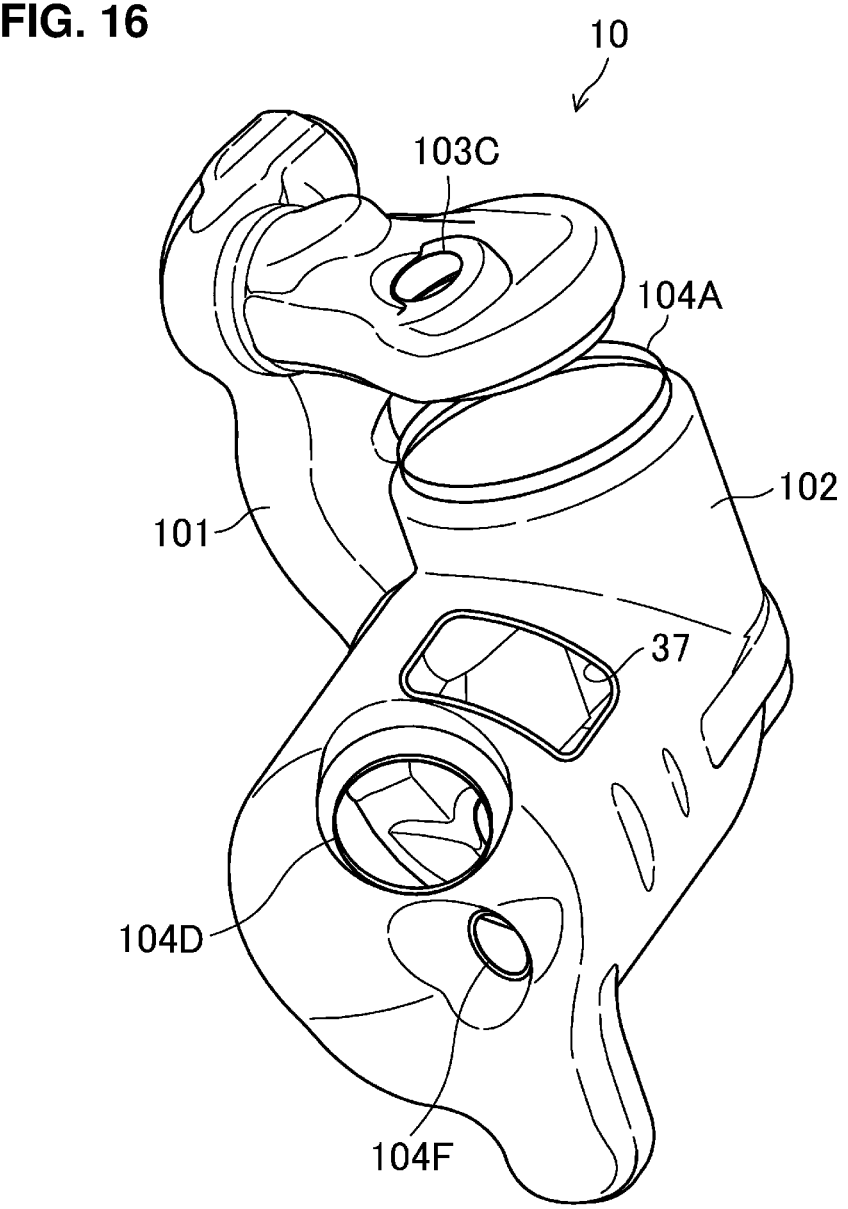
FIG. 16 is a perspective view of the heat insulating material, when viewed from a lower-right rearward side.

As shown in FIGS. 9, 10, 12 and others, the upstream-side heat insulating material 101 is configured to cover a whole part of the exhaust manifold M, and this heat insulating material 101 is provided with four independent exhaust pipe opening portions 103A which are positioned at inlets of independent exhaust pipes which are respectively connected to exhaust ports of the engine body E, a collective pipe outlet opening portion 103B which is positioned at an outlet of a collective pipe of the exhaust manifold M, and an opening portion 103C for attaching an oxygen sensor.

As shown in FIGS. 9, 10, 11, 13 and others, the downstream-side heat insulating material 102 is configured to cover a whole part of the catalyst device Q, and this heat insulating material 102 is provided with a three-way-catalyst inlet opening portion 104A which is positioned near the three-way-catalyst staring end face 2A of the three-way catalyst 2, an opening portion 104B for attaching a NOx sensor, an opening portion 104C for an upstream-side pressure takeout portion, an opening portion 104D for an exhaust-gas outlet, an opening portion 104E for an EGR attaching hole, and an opening portion 104F for a downstream-side pressure takeout portion.

It is preferable in suppressing heat releasing that the above-described opening portions be configured to have a smaller opening area, and they have substantially the same opening area as the opening area of the outlets/inlets of the exhaust manifold M or the catalyst device Q and the opening area which is the smallest for attaching the various kinds of sensor and the like. Herein, the shape of the opening portion can be any shape, such as a roughly circular shape or a roughly rectangular shape, as long as the opening area is the smallest.

Herein, as shown in FIGS. 11, 12, 14, 16 and others, at a portion of the downstream-side heat insulating material 102 which covers the GPF 3 are provided two opening portions for attaching the supporting member to support the catalyst device Q, i.e., a first opening portion 36 and a second opening portion 37, at right-and-left both sides (both sides of the cylinder row direction) of the portion of the downstream-side heat insulating material 102 which is positioned on the side face of the GPF 3.

It is preferable that the opening area of the first opening portion 36 and the second opening portion 37 be set to be as small as possible as long as the opening area is properly large enough to attach supporting members which will be described later. Herein, the GPF 3 is arranged on the leftward side relative to the center of the engine body E as described above. Accordingly, the supporting member which supports the rightward side of the GPF 3 is configured to be larger than the supporting member which supports the leftward side of the GPF 3 from aspects of a weight balance. The opening area of the second opening portion 37 is configured to be larger than that of the first opening portion 36 in accordance with the size of the supporting members. Herein, the size of the supporting members and the opening area of the opening portions are properly changeable according to the vehicle layout. Herein, while the shape of the first opening portion 36 and the second opening portion 37 is set to be of the roughly rectangular shape, any shape, such as the roughly circular shape, is applicable so that the opening area is the smallest.

Figure 11:
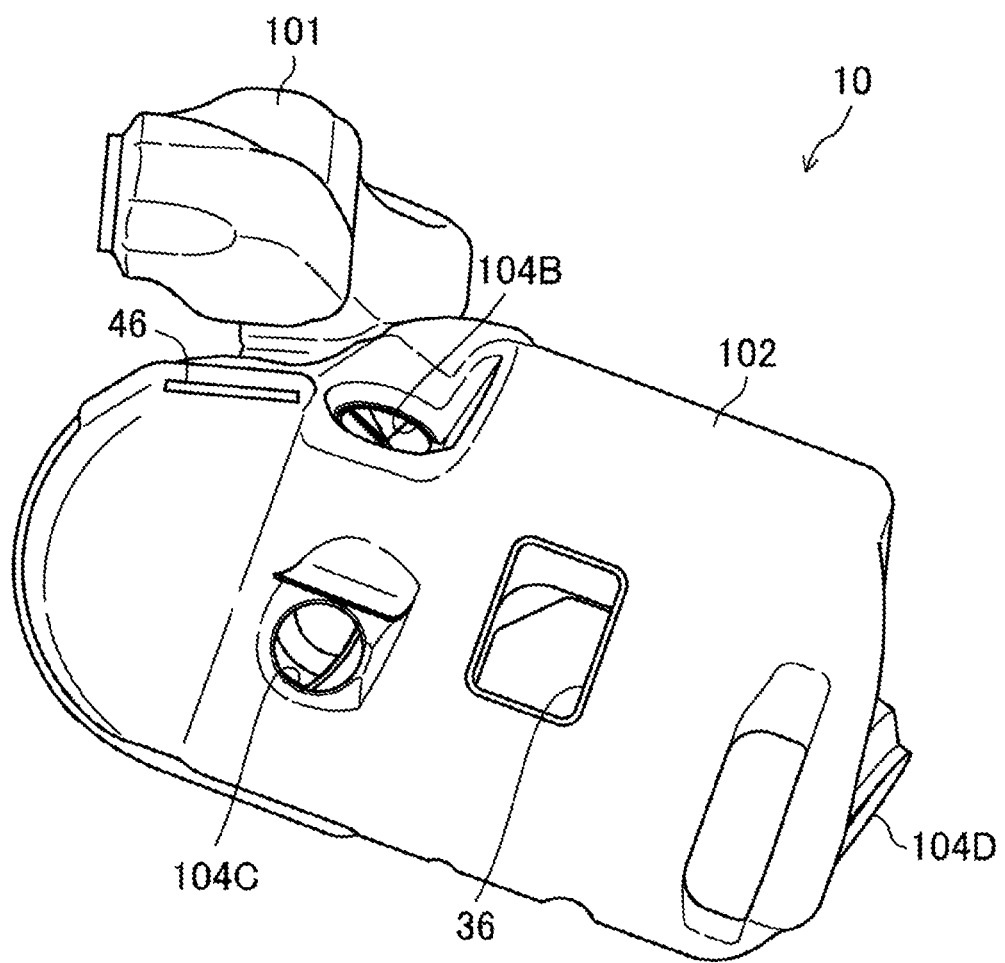
FIG. 11 is a left side view of the heat insulating material.

Further, as shown in FIG. 11, a third opening portion 46 is provided at a portion of the downstream-side heat insulating material 102 which covers the connecting pipe 4 positioned on the upstream side of the GPF 3. The third opening portion 46 has a smaller opening area than the first opening portion 36 and the second opening portion 37. The opening area of the third opening portion 46 is preferably 10-70% of the opening area of the first opening portion 36 or the second opening portion 37 which has the smaller opening area than the other, i.e., the opening area of the first opening portion 36, from aspects of suppressing the heat releasing at the connecting pipe 4. Herein, while the shape of the third opening portion 46 is a slit shape, any shape, such as the roughly rectangular shape or the roughly circular shape, is applicable as long as the opening area is the smallest.

<Support Structure of Exhaust-Gas Purifying Device>

As shown in FIGS. 4 and 5, to the right-and-left both side faces of the GPF 3 are attached two supporting members (plural supporting members) for supporting the catalyst device Q, i.e., a first GPF supporting member 38 (a first supporting member) and a second GPF supporting member 39 (a second supporting member), whereby the catalyst device Q is supported from the right-and-left both sides.

Figure 17:
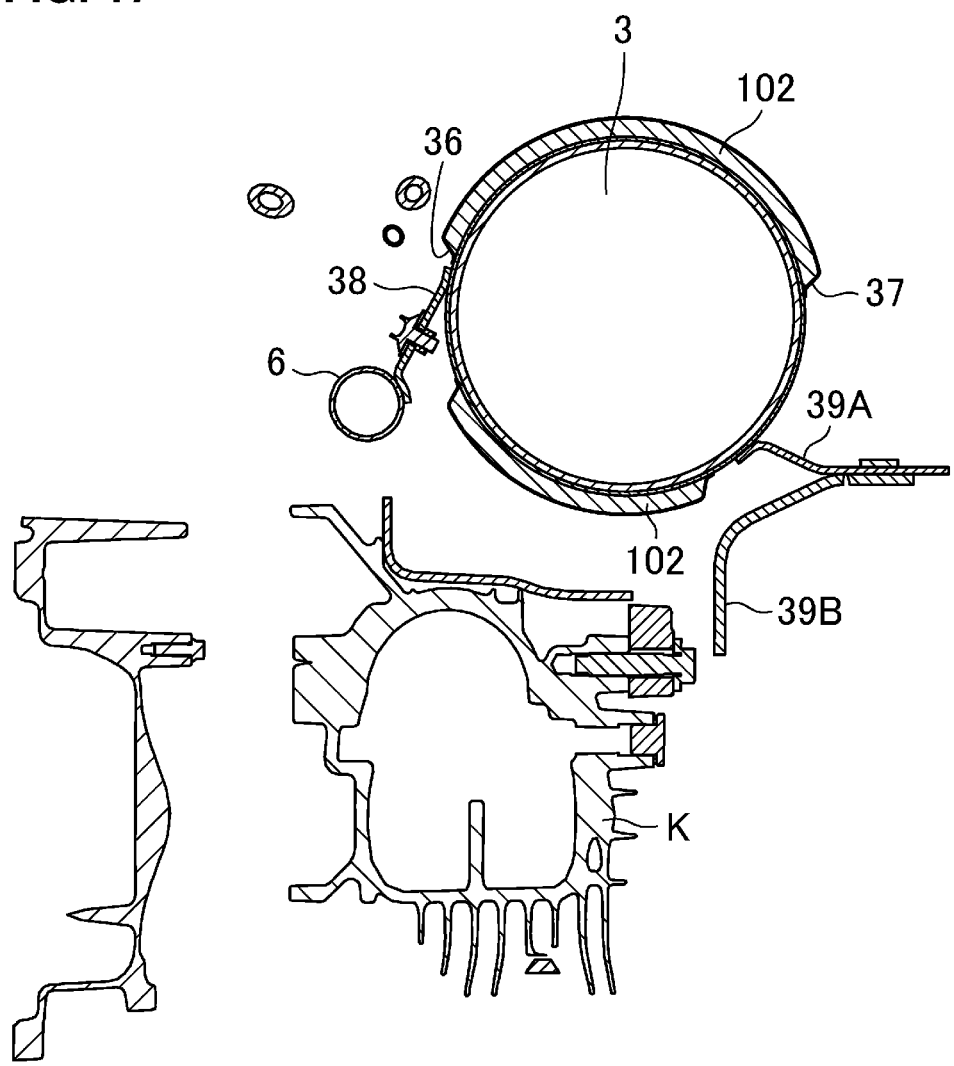
FIG. 17 is a sectional view taken along line XVII-XVII of FIG. 1.

A tip of the first GPF supporting member 38 contacts the leftward-side face of the GPF 3 through the first opening portion 36 as shown in FIG. 17. A base end of the first GPF supporting member 38 is attached to the takeout passage for EGR 6 which is positioned between the GPF 3 and the transmission J as shown in FIGS. 3, 4 and 17. A takeout passage support portion for EGR 61 (a first supporting member) for supporting the takeout passage for EGR 6 is attached to the takeout passage for EGR 6, and its base end is attached to the transmission J. The first GPF supporting member 38 and the takeout passage support portion for EGR 61 are attached to the transmission J as the first supporting member, and thereby support the GPF 3 through the first opening portion 36. Thus, by supporting the GPF 3 at the transmission J, not at the engine body E, the length of the first supporting member can be shortened, and the decrease of the support rigidity or the weigh increase can be suppressed.

In other words, the above-described structure is described as follows. That is, the first supporting member is fixedly supported to the takeout passage for EGR 6 at a so-called middle portion from the tip of the first GPF supporting member 38 attached to the GPF 3 to the base end of the takeout passage support portion for EGR 61. Thus, by supporting the first supporting member by the takeout passage for EGR 6, the size of the first supporting member can be made small, and the first opening portion 36 can be made small accordingly.

Herein, the pressure-difference sensor 83 and the upstream-side pressure takeout portion 81 are arranged on the same leftward side as the takeout passage for EGR 6. Accordingly, the upstream-side pressure takeout passage 81A can be also provided to extend on the same leftward side as the takeout passage for EGR 6. As shown in FIG. 4, an upstream-side pressure takeout supporting member 81A3 which supports the upstream-side pressure takeout passage 81A is fixed to the first EGR supporting member 38. The upstream-side pressure takeout passage 81A is also supported by the transmission J. Thus, by supporting the upstream-side pressure takeout passage 81A by using the takeout passage support portion for EGR 61, it becomes unnecessary to provide another opening portion for supporting the upstream-side pressure takeout passage 81A at the heat insulating material 10, thereby improving the compactness/layout performance of the device.

Figure 18:
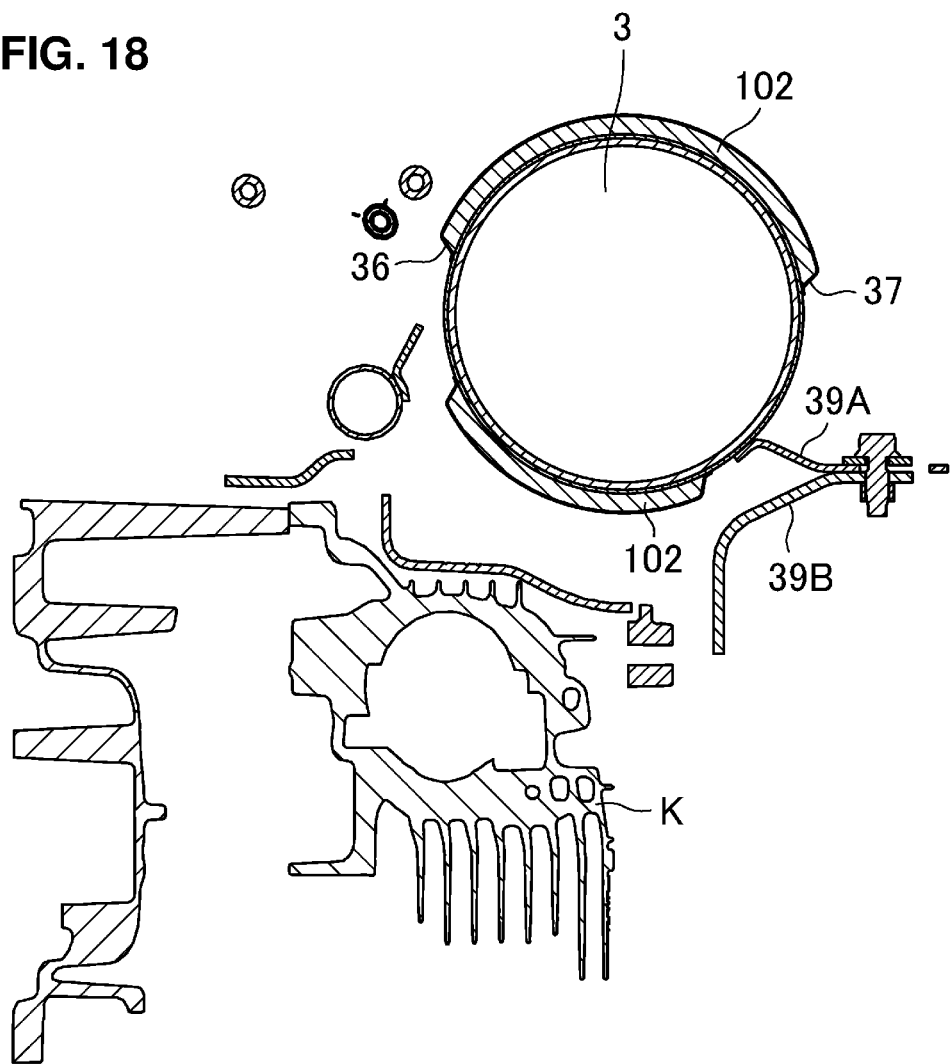
FIG. 18 is a sectional view taken along line XVIII-XVIII of FIG. 7.
Figure 19:
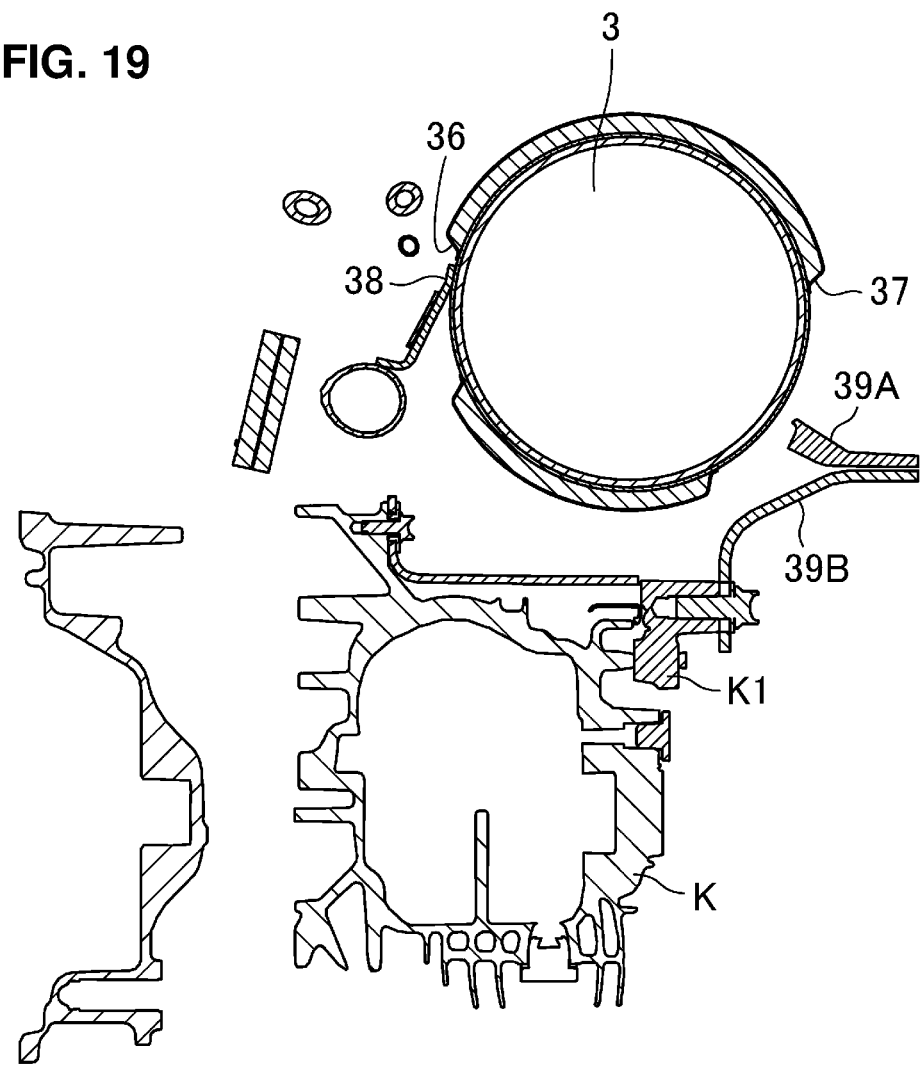
FIG. 19 is a sectional view taken along line XIX-XIX of FIG. 7.

The second GPF supporting member 39 is divided into an upstream-side second GPF supporting member 39A and a downstream-side second GPF supporting member 39B which are fixed by a bolt as shown in FIGS. 6, 7 and 18. The upstream-side second GPF supporting member 39A contacts a right-side side face of the GPF 3 through the second opening portion 37. The downstream-side second GPF supporting member 39B is fixed to the power-dividing-device supporting member K1 by a bolt as shown in FIGS. 7 and 19. They are supported by the engine body E. Thus, by attaching the second GPF supporting member 39 to the power-dividing-device supporting member K1, the supporting member of the GPF 3 and the power dividing device K1 can be commonly used, thereby improving the compactness/layout performance of the device.

Figure 20:
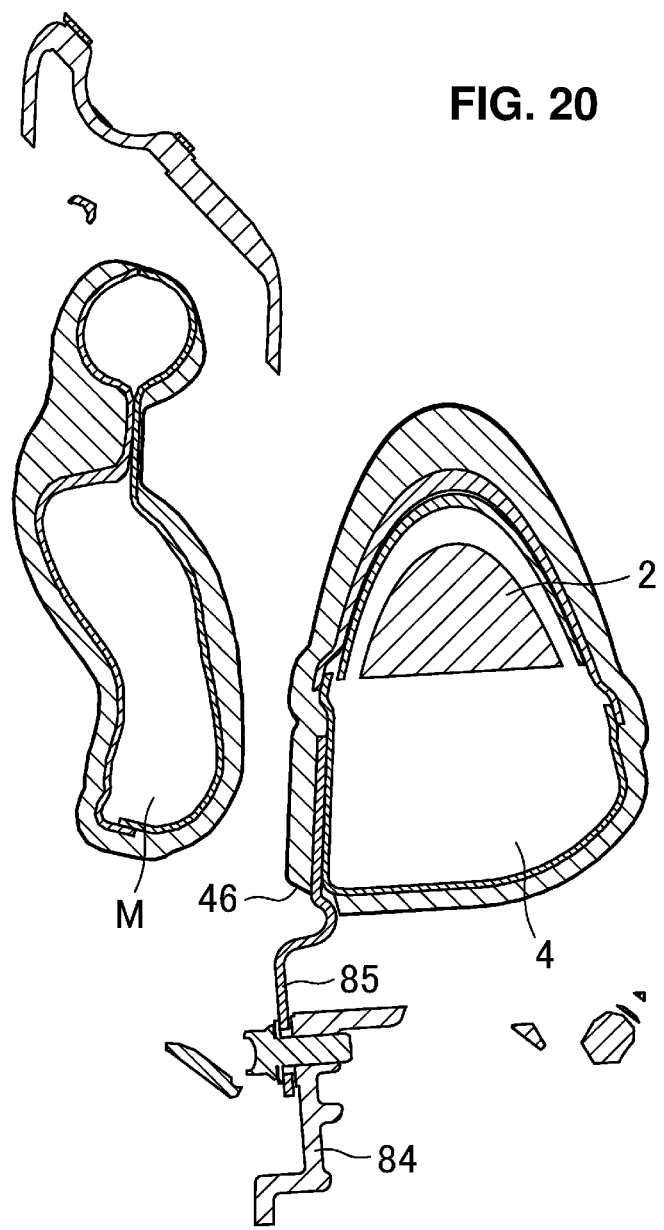
FIG. 20 is a sectional view taken along line XX-XX of FIG. 2.

Further, in addition to the support by the first GPF supporting member 38 and the second GPF supporting member 39, the catalyst device Q is further supported by a first connecting-pipe support portion 85 and a second connecting-pipe support portion 84 (third supporting member) through the third opening portion 46 which is provided at a portion covering the connecting pipe 4 of the downstream-side heat insulating material 102. Specifically, as shown in FIG. 1, the second connecting-pipe support portion 84 is fixed to the cylinder block E1 by a bolt. Further, the first connecting-pipe support portion 85 is fixed to the second connecting-pipe support portion 84 by a bolt as shown in FIGS. 2 and 20. One end of the connecting-pipe support portion 85 is inserted into a space between the downstream-side heat insulating material 102 and the connecting pipe 4 through the third opening portion 46, and joined to an upper portion of the connecting pipe 4. The connecting pipe, i.e., the catalyst device Q, is supported by the engine block E1 via the first connecting-pipe support portion 85 and the second connecting-pipe support portion 84. Thus, by adding a reinforcing support from the leftward side of the connecting pipe 4 which is positioned in front of the catalyst device Q, the support rigidity of the GPF 3 which is positioned on the leftward side can be improved. Herein, since a state of the first connecting-pipe support portion 85 is shown in FIG. 2, illustration of the pressure-difference sensor attaching plate 83A is omitted here.

Further, the first connecting-pipe support portion 85 is configured to be inserted into the space between an inside surface of the portion of the downstream-side heat insulating material 102 which covers the connecting pipe 4 and an outside surface of the connecting pipe 4 through the third opening portion 46 as descried above. Thereby, the opening area of the third opening portion 46 can be made as small as possible, thereby suppressing the heat releasing from the connecting pipe 4.

Moreover, as shown in FIG. 1, the pressure-difference sensor attaching plate 83A is fixed to the second connecting-pipe support portion 84 by a bolt, and the pressure-difference sensor 83 is fixed to the second connecting-pipe support portion 84 via the pressure-difference sensor attaching plate 83A. Thus, the pressure-difference sensor 83 is supported by the cylinder block E1 via the second connecting-pipe support portion 84 as well. Since the second connecting-pipe support portion 84 can be used commonly as a support of the pressure-difference sensor 83 in addition to the catalyst device Q according to the present structure, the compactness/layout performance of the device can be improved.

As described above, the support rigidity of the exhaust-gas purifying device 1 can be improved by supporting the catalyst device Q by the plural supporting members through the plural opening portions according to the present structure. Further, the heat releasing can be suppressed properly by attaching the supporting members to the GPF 3 provided at the downstream side, compared to a case where an opening portion is provided at a portion of the downstream-side heat insulating material 102 which covers the three-way catalyst 2 provided at the upstream side. Moreover, a weight imbalance, in the lateral direction, of the device can be securely supported by providing the first GPF supporting member 38 and the second GPF supporting member 39 on the both sides, in the lateral direction, of the GPF 3.

Herein, by arranging the GPF 3 closely to and downstream of the three-way 2, the GPF 3 can be properly regenerated through a reaction of oxygen and soot (i.e., PM) which is trapped by the GPF 3 by utilizing heat of reaction of the three-way catalyst 2. In general, if the opening portion is provided at the three-way catalyst 2, the reaction performance at the three-way catalyst 2 lowers, so that a regeneration efficiency of the GPF 3 decreases as well. That is, providing the opening portion at the three-way catalyst 2 causes a decrease of the GPF regeneration efficiency, thereby affecting badly. According to the present invention, however, since the opening portion is provided at the GPF 3, the exhaust-gas purification performance by the three-way catalyst 2 can be secured, and thereby the GPF regeneration performance can be secured properly as well.

Further, when the soot trapped by the GPF 3 and the oxygen react at the GPF 3, the temperature of the GPF 3 increases because of the reaction heat. Since the heat insulation does not occur at the opening portion, the temperature of an area where the opening portion is provided becomes lower than that of the other area where the opening portion is not provided. Consequently, the soot and the oxygen do not react properly at the area near the opening portion during a normal engine operation, so that the soot accumulates easily there. Accordingly, it is determined whether or not an output value of the pressure-difference sensor 83 which detects the pressure difference between the upstream side and the downstream side of the GPF 3 is greater than a specified threshold. If it is determined that the values is greater than the specified threshold (the pressure difference is greater), it is judged that the soot accumulates more than a specified quantity, and then a mandatory regeneration control that the soot trapped by the GPF 3 and the oxygen are made to react mandatorily is conducted. Specifically, a post injection that fuel is injected by a fuel injector at a timing where fuel injection does not contribute to generating an engine torque, for example, at or later than a middle stage of an expansion stroke (herein, the middle stage means a middle period of the expansion stroke in a case where the expansion stroke is equally divided into three periods; an early period, a middle period, and an end period) is conducted during a decorrelation fuel-cut operation so that an excess air ratio λ is set at 1.2-1.3. Thereby, the post-injected fuel reacts at the three-way catalyst 2 so as to increase the exhaust-gas temperature, so that the GPF temperature increases and thereby the GPF 3 is regenerated. Herein, since the soot accumulates near the opening portion considerably as described above, the reaction heat is so large that a large load of heat is applied to the GPF 3. According to the present invention, however, since the plural opening portions are provided at the GPF 3, the heat load can be made properly small at the area near the opening portions, compared to a case where a single opening portion is provided. Consequently, any breakage of the GPF 3 can be suppressed.

Hereafter, other embodiment of the present invention will be described. The same portions as the above-described embodiment are denoted by the same reference characters, specific descriptions of which are omitted here.

While the first catalyst is the three-way catalyst 2 and the second catalyst is the GPF 3 in the above-described embodiment, any other catalysts are applicable. Specifically, in case where the exhaust-gas purifying device 1 is applied to a diesel engine, for example, a diesel particulate filter may be used. Further, an oxidation catalyst and a NOx-purification catalyst may be combined as the first catalyst and the second catalyst.

The three-way catalyst 2 is provided slightly downstream of the GPF 3 as shown in FIG. 9 in the above-described embodiment. However, the three-way catalyst 2 may be provided at a similar level to the GPF 3 or at a higher level than the GPF 3. Herein, in any case, the various sensors and others can be provided properly at any position where the exhaust gas is uniform.

The outlet of the exhaust manifold M is arranged on the rightward side in the cylinder row direction in the above-described embodiment, and the GPF 3 is arranged on the leftward side. However, the outlet of the exhaust manifold M may be arranged on the leftward side in the cylinder row direction and the GPF 3 may be arranged on the rightward side.

Further, while the catalyst device Q is supported by the first GPF supporting member 38, the second GPF supporting member 39, the first connecting-pipe support portion 85, and the second connecting-pipe support portion 84 in the above-described embodiment, it may be supported only by the first GPF supporting member 38 and the second GPF supporting member 39 from aspects of simplification of the device. Further, any other supporting member may be added from improvement of the support rigidity.

What is claimed is:

1. An exhaust device of an engine, comprising:
    an exhaust manifold provided on an exhaust path for guiding exhaust gas from the engine;
    a first catalyst provided at a downstream side, in an exhaust-gas flowing direction, of the exhaust manifold for purifying the exhaust gas guided by the exhaust manifold;
    a second catalyst provided at a downstream side, in the exhaust-gas flowing direction, of the exhaust manifold for purifying the exhaust gas flowing down through the first catalyst; and
    a heat insulating material covering the exhaust manifold, the first catalyst, and the second catalyst,
    wherein the heat insulating material has a plurality of openings formed in a portion of a covering of a second catalyst case and a plurality of supports are equipped to the second catalyst case through the plurality of openings.

2. The exhaust device of the engine of claim 1, wherein said engine is an in-line multi-cylinder engine comprising an engine body provided with a plurality of cylinders, said second catalyst is provided such that a center axis thereof is substantially vertical to a direction of a cylinder row of the engine body and a center thereof is offset, to one side, from a center, in the cylinder row direction, of the cylinder row, said plural opening portions of said insulating material include a first opening portion and a second opening portion which are respectively provided on both sides, in the cylinder row direction, of the second catalyst, and the second catalyst is supported by a first support and a second support which are respectively provided through said first opening portion and said second opening portion from the both sides, in the cylinder row direction, of the second catalyst.

3. The exhaust device of the engine of claim 2, wherein said heat insulating material has a third opening portion which is positioned upstream, in the exhaust-gas flowing direction, of the second catalyst and has a smaller opening area than said first opening portion and said second opening portion, and the second catalyst is further supported by a third support which is provided through said third opening portion.

4. The exhaust device of the engine of claim 3, wherein said second catalyst is a particulate filter, there is provided a pressure-difference detector to detect a difference in pressure between an upstream side and a downstream side, in the exhaust-gas flowing direction, of said particulate filter, and said pressure-difference detector is supported by said third support.

5. The exhaust device of the engine of claim 2, wherein a transmission is provided close to a first-opening-portion side of said second catalyst, and said first support is attached to said transmission.

6. The exhaust device of the engine of claim 2, wherein an EGR passage is connected to a downstream side, in the exhaust-gas flowing direction, of said second catalyst, said EGR passage is positioned between the second catalyst and a supporting body to which a base end of said first support is attached, and said first support is fixedly supported at the EGR passage at a middle portion thereof between a tip end thereof which is attached to the second catalyst and the base end thereof.

7. The exhaust device of the engine of claim 2, wherein said second catalyst is a particulate filter, there is provided a pressure-difference detector to detect a difference in pressure between an upstream side and a downstream side, in the exhaust-gas flowing direction, of said particulate filter, and said pressure-difference detector is supported by said first support.

8. The exhaust device of the engine of claim 2, wherein said engine is installed to a four-wheel drive vehicle provided with a power dividing device, said power dividing device is supported at the engine body via a fourth support, and said second support is attached to said fourth support, whereby the second support is supported at the engine body.

\* \* \* \* \*